United States Patent
Coatney et al.

(10) Patent No.: US 8,327,186 B2
(45) Date of Patent: Dec. 4, 2012

(54) TAKEOVER OF A FAILED NODE OF A CLUSTER STORAGE SYSTEM ON A PER AGGREGATE BASIS

(75) Inventors: Susan M. Coatney, Cupertino, CA (US); Steven S. Watanabe, San Jose, CA (US)

(73) Assignee: NetApp, Inc., Sunnyvale, CA (US)

( * ) Notice: Subject to any disclaimer, the term of this patent is extended or adjusted under 35 U.S.C. 154(b) by 344 days.

(21) Appl. No.: 12/401,458

(22) Filed: Mar. 10, 2009

(65) Prior Publication Data

US 2010/0232288 A1 Sep. 16, 2010

(51) Int. Cl.
*G06F 11/00* (2006.01)
(52) U.S. Cl. ........................................ 714/6.3
(58) Field of Classification Search .................... 714/6.3
See application file for complete search history.

(56) References Cited

U.S. PATENT DOCUMENTS

| | | | |
|---|---|---|---|
| 7,330,996 B2 * | 2/2008 | Coteus et al. | 714/3 |
| 7,392,302 B2 * | 6/2008 | Halpern | 709/223 |
| 7,430,568 B1 | 9/2008 | DeKoning | |
| 7,487,390 B2 * | 2/2009 | Saika | 714/13 |
| 7,502,954 B1 * | 3/2009 | Strickland et al. | 714/6.21 |
| 7,523,341 B2 * | 4/2009 | Hufferd et al. | 714/6.3 |
| 7,613,947 B1 * | 11/2009 | Coatney et al. | 714/6.1 |
| 7,657,786 B2 * | 2/2010 | Takuwa et al. | 714/13 |
| 7,702,947 B2 * | 4/2010 | Peddada | 714/4.1 |
| 7,734,947 B1 * | 6/2010 | Frangioso et al. | 714/4.1 |
| 2002/0049925 A1 * | 4/2002 | Galipeau et al. | 714/6 |
| 2002/0116593 A1 | 8/2002 | Kazar et al. | |
| 2002/0194390 A1 | 12/2002 | Elving | |
| 2003/0135782 A1 * | 7/2003 | Matsunami et al. | 714/5 |
| 2004/0030668 A1 | 2/2004 | Pawlowski | |
| 2004/0181707 A1 * | 9/2004 | Fujibayashi | 714/6 |
| 2005/0138517 A1 * | 6/2005 | Monitzer | 714/746 |
| 2005/0228834 A1 | 10/2005 | Shinkai | |
| 2006/0036896 A1 * | 2/2006 | Gamache et al. | 714/4 |
| 2006/0050629 A1 | 3/2006 | Saika | |

(Continued)

OTHER PUBLICATIONS

U.S. Appl. No. 12/401,533, filed Mar. 10, 2009, Miller, et al.

(Continued)

*Primary Examiner* — Scott Baderman
*Assistant Examiner* — Neil Miles
(74) *Attorney, Agent, or Firm* — Stattler-Suh PC

(57) ABSTRACT

A cluster comprises a plurality of nodes that access a shared storage, each node having two or more partner nodes. A primary node may own a plurality of aggregate sub-sets in the shared storage. Upon failure of the primary node, each partner node may take over ownership of an aggregate sub-set according to an aggregate failover data structure (AFDS). The AFDS may specify, an ordered data structure of two or more partner nodes to take over each aggregate sub-set, the ordered data structure comprising at least a first-ordered partner node assigned to take over the aggregate sub-set upon failure of the primary node and a second-ordered partner node assigned to take over the aggregate sub-set upon failure of the primary node and the first-ordered partner node. The additional workload of the failed primary node is distributed among two or more partner nodes and protection for multiple node failures is provided.

24 Claims, 11 Drawing Sheets

U.S. PATENT DOCUMENTS

| | | |
|---|---|---|
| 2006/0101033 A1 | 5/2006 | Hu et al. |
| 2006/0117212 A1* | 6/2006 | Meyer et al. ............... 714/4 |
| 2006/0218362 A1 | 9/2006 | McManis |
| 2006/0248088 A1 | 11/2006 | Kazar et al. |
| 2007/0113032 A1 | 5/2007 | Kameyama et al. |
| 2007/0168693 A1 | 7/2007 | Pittman |
| 2007/0220323 A1 | 9/2007 | Nagata |
| 2008/0126372 A1 | 5/2008 | Holt |
| 2009/0024868 A1* | 1/2009 | Joshi et al. ............... 714/4 |
| 2009/0063668 A1* | 3/2009 | Bish et al. ............... 709/223 |
| 2009/0276771 A1 | 11/2009 | Nickolov |
| 2010/0107158 A1 | 4/2010 | Chen |
| 2010/0153617 A1 | 6/2010 | Miroshnichenko |
| 2010/0232288 A1 | 9/2010 | Coatney et al. |
| 2011/0078490 A1* | 3/2011 | He et al. ............... 714/4.11 |
| 2011/0296000 A1 | 12/2011 | Ferris |

OTHER PUBLICATIONS

U.S. Appl. No. 11/606,727, filed Nov. 30, 2006, Coatney, et al.

U.S. Appl. No. 12/432,404, filed Apr. 29, 2009, Thomas Rudolf Wenzel.

U.S. Appl. No. 11/606,727, filed Nov. 30, 2006, Susan M. Coatney, et al.

U.S. Appl. No. 12/401,533, filed Mar. 10, 2009, Miller et al., Office Action dated Apr. 26, 2011.

U.S. Appl. No. 12/432,404, filed Apr. 29, 2009, Wenzel, Office Action dated Apr. 13, 2011.

U.S. Appl. No. 13/278,947, filed Oct. 21, 2011, Wenzel.

Office Action dated May 22, 2012 issued by the USPTO for U.S. Appl. No. 13/278,947.

* cited by examiner

TAKEOVER OF A FAILED NODE OF A CLUSTER STORAGE SYSTEM ON A PER AGGREGATE BASIS

FIELD OF THE INVENTION

The present invention relates to networked storage systems, and particularly, to takeover procedures of a failed node in a cluster storage system on a per aggregate basis.

BACKGROUND OF THE INVENTION

A storage system typically comprises one or more storage devices into which information may be entered, and from which information may be obtained, as desired. The storage system includes a storage operating system that functionally organizes the system by, inter alia, invoking storage operations in support of a storage service implemented by the system. The storage system may be implemented in accordance with a variety of storage architectures including, but not limited to, a network-attached storage environment, a storage area network and a disk assembly directly attached to a client or host computer. The storage devices are typically disk drives organized as a disk array, wherein the term "disk" commonly describes a self-contained rotating magnetic media storage device. The term disk in this context is synonymous with hard disk drive (HDD) or direct access storage device (DASD).

The storage operating system of the storage system may implement a high-level module, such as a file system, to logically organize the information stored on volumes as a hierarchical structure of data containers, such as files and logical units (LUs). For example, each "on-disk" file may be implemented as set of data structures, i.e., disk blocks, configured to store information, such as the actual data for the file. These data blocks are organized within a volume block number (vbn) space that is maintained by the file system. The file system may also assign each data block in the file a corresponding "file offset" or file block number (fbn). The file system typically assigns sequences of fbns on a per-file basis, whereas vbns are assigned over a larger volume address space. The file system organizes the data blocks within the vbn space as a "logical volume"; each logical volume may be, although is not necessarily, associated with its own file system.

A known type of file system is a write-anywhere file system that does not overwrite data on disks. If a data block is retrieved (read) from disk into a memory of the storage system and "dirtied" (i.e., updated or modified) with new data, the data block is thereafter stored (written) to a new location on disk to optimize write performance. A write-anywhere file system may initially assume an optimal layout such that the data is substantially contiguously arranged on disks. The optimal disk layout results in efficient access operations, particularly for sequential read operations, directed to the disks. An example of a write-anywhere file system that is configured to operate on a storage system is the Write Anywhere File Layout (WAFL®) file system available from NetApp, Inc. Sunnyvale, Calif.

The storage system may be further configured to operate according to a client/server model of information delivery to thereby allow many clients to access data containers stored on the system. In this model, the client may comprise an application, such as a database application, executing on a computer that "connects" to the storage system over a computer network, such as a point-to-point link, shared local area network (LAN), wide area network (WAN), or virtual private network (VPN) implemented over a public network such as the Internet. Each client may request the services of the storage system by issuing access requests (read/write requests) as file-based and block-based protocol messages (in the form of packets) to the system over the network.

It is advantageous for the services and data provided by a storage system, such as a storage node, to be available for access to the greatest degree possible. Accordingly, some storage systems provide storage system nodes interconnected as a cluster, with a first storage system node being clustered with a second storage system node to provide high availability of data access. Each node of the cluster may include (i) a storage server (referred to as a "D-module") adapted to service particular aggregate(s) or volume(s) and (ii) a multi-protocol engine (referred to as an "N-module") adapted to redirect the data access requests to any storage server of the cluster. In the illustrative embodiment, the storage server of each node is embodied as a disk element (D-module) and the multi-protocol engine is embodied as a network element (N-module). The N-module receives a multi-protocol data access request from a client, converts that access request into a cluster fabric (CF) message and redirects the message to an appropriate D-module of the cluster.

The nodes of the cluster storage system may be configured to communicate with one another to act collectively to increase performance or to offset any single node failure within the cluster. Each node in the cluster may have a predetermined failover "partner" node. When a node failure occurs (where the failed node is no longer capable of processing access requests for clients), the partner node of the failed node may "takeover" the data services of the failed node. In doing so, access requests sent to the failed node may be re-directed to the partner node for processing. In particular, a cluster may provide data-access service to clients by providing access to shared storage (comprising a set of storage devices). Typically, clients will connect with a node of the cluster for data-access sessions with the node.

The shared storage may comprise a plurality of aggregates, where each aggregate may be configured to contain one or more volumes. The volumes may be configured to store content of data containers, such as files and logical units, served by the cluster in response to multi-protocol data access requests issued by clients. Each node of a cluster may "own" an assigned predetermined set of aggregates (aggregate set) within the shared storage, whereby only the assigned node is configured to service data for the predetermined aggregate set during normal operating conditions (when no node has failed). However, upon failure of a node, "ownership" of the entire aggregate set of the failed node may be transferred to the partner node (so that servicing of data for the entire aggregate set of the failed node may be taken over by the partner node). As used herein, a node may be referred to as a local/primary node when referring to a current node being discussed, whereas a remote/partner node refers to a predetermined failover partner node of the local/primary node. As used herein, various components residing on the primary node may likewise be referred to as a local/primary component (e.g., local memory, local file system, etc.) and various components residing on a remote node may likewise be referred to as a remote component (e.g., remote memory, remote file system, etc.).

As described above, a cluster may be configured such that a partner node may takeover the work load of a failed primary node where the partner node assumes the tasks of processing and handling any data access requests normally processed by the failed primary node. Although this provides protection against a node failure, the entire additional workload (of servicing all aggregates of the failed primary node) is imposed on the partner node which may substantially reduce the ability of the partner node to service its own aggregates. Also, protection for only a single node failure in the cluster is provided. As such, there is a need for a more effective method for providing node failure protection in a cluster storage system.

SUMMARY OF THE INVENTION

In some embodiments, a cluster storage system comprises a plurality of nodes that access a set of storage devices (shared storage), each node having two or more predetermined failover partner nodes. As such, each primary node of a cluster may have two or more failover partner nodes that are configured to takeover the workload of the node if the node fails. Each primary node may own and service a set of two or more aggregates ("aggregate set") in the shared storage, the aggregate set being sub-divided into two or more sub-sets of aggregates ("aggregate sub-sets"). In these embodiments, upon failure of the primary node, each of the two or more partner nodes takes over ownership and servicing of an aggregate sub-set of the failed primary node. As such, the additional workload of the failed primary node may be distributed among two or more partner nodes.

Each node in the cluster may comprise a storage operating system having a takeover monitor module. The takeover monitor modules of the nodes may operate in conjunction to perform aggregate failover procedures described herein. A takeover monitor module may use an aggregate failover data structure (AFDS) to determine which partner node takes over which aggregate sub-set of a failed node. In these embodiments, for each primary node in the cluster, the AFDS may specify each aggregate owned by the primary node and a partner node assigned to takeover the aggregate if the primary node fails. In some embodiments, for each primary node, the AFDS may list two or more aggregate sub-sets, each aggregate sub-set comprising one or more aggregates within the shared storage that are owned by the primary node. For each aggregate sub-set, the AFDS may specify a partner node assigned to takeover the aggregate sub-set if the primary node fails. For example, for primary node A, the AFDS may list aggregate sub-set X comprising aggregate 1 and aggregate sub-set Y comprising aggregates 3-6 in the shared storage, aggregates 1 and 3-6 being all the aggregates owned by primary node A. The AFDS may further specify partner node B to takeover aggregate sub-set X and partner node C to takeover aggregate sub-set Y if the primary node fails.

In further embodiments, for each aggregate sub-set owned by the primary node, the AFDS may specify an ordered list/data structure of two or more partner nodes assigned to takeover the aggregate. The ordered data structure for an aggregate may specify the order of partner nodes that is to takeover the aggregate sub-set in the case of multiple node failures (from a highest-ordered partner node to a lowest-ordered partner node). For example, an ordered data structure may specify a "first-ordered" partner node (the highest-ordered partner node) that is to takeover the aggregate sub-set if the primary node fails, whereby takeover of the aggregate sub-set does not require any partner node failures. The ordered data structure may specify further partner nodes (lower-ordered partner nodes) that are assigned to takeover the aggregate sub-set upon failure of the primary node and failure of each higher-ordered partner node on the ordered data structure. For example, the ordered data structure may further specify a "second-ordered" partner node that is to takeover the aggregate sub-set if the primary node and the first-ordered partner node fails, a "third-ordered" partner node that is to takeover the aggregate sub-set if the primary node, the first-ordered partner node, and the second-ordered partner node fails, etc.

For example, for aggregate sub-set X owned by the primary node, the AFDS may specify an ordered data structure comprising partner node B, partner node D, and partner node C; whereby partner node B is to takeover aggregate sub-set X if the primary node fails, partner node D is to takeover aggregate sub-set X if the primary node and partner node B fails, and partner node C is to takeover aggregate sub-set X if the primary node, partner node B, and partner node D fails. As such, the AFDS provides protection against multiple node failures for each aggregate sub-set owned by the primary node.

As described above, an aggregate set (in a shared storage) owned by a primary node may be sub-divided into two or more aggregate sub-sets. The primary node may have two or more partner nodes, each partner node being assigned to takeover a particular aggregate sub-set if the primary node fails. As such, the additional workload of the failed primary node may be distributed among two or more partner nodes on a per aggregate basis (rather than the additional workload of the entire aggregate set being imposed on a single partner node). In some embodiments, at least a first and second partner node are assigned to each aggregate sub-set, the first partner node to takeover the aggregate sub-set if the primary node fails and the second partner node to takeover the aggregate sub-set if the primary node and first partner node fails. As such, data servicing for each aggregate sub-set may continue to be provided by the cluster even after multiple node failures.

DETAILED DESCRIPTION

The disclosure of U.S. patent application Ser. No. 11/606,727, filed on Nov. 30, 2006, entitled "SYSTEM AND METHOD FOR STORAGE TAKEOVER," by Susan M. Coatney et al., is expressly incorporated herein by reference.

In the following description, numerous details are set forth for purpose of explanation. However, one of ordinary skill in the art will realize that the embodiments described herein may be practiced without the use of these specific details. In other instances, well-known structures and devices are shown in block diagram form in order not to obscure the description with unnecessary detail.

The description that follows is divided into four sections. Section I describes a cluster environment in which some embodiments operate. Section II describes a storage operating system having a takeover monitor module for taking over a node on a per aggregate basis. Section III describes a shared storage of the cluster. Section IV describes taking over of a node on a per aggregate basis.

I. Cluster Environment

Figure 1A:
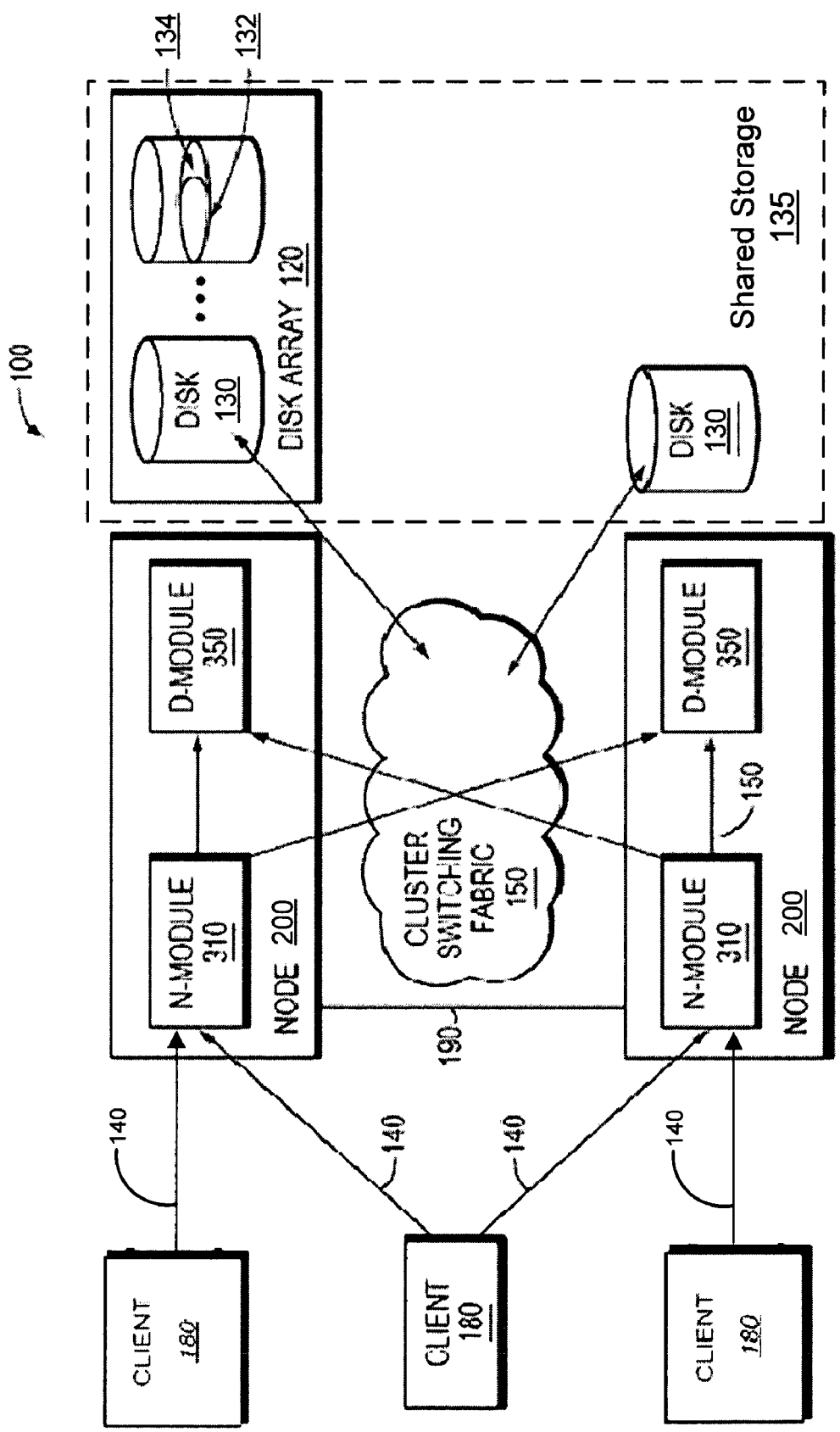
FIGS. 1A-B are schematic block diagrams of an exemplary cluster environment in which some embodiments operate.
Figure 1B:
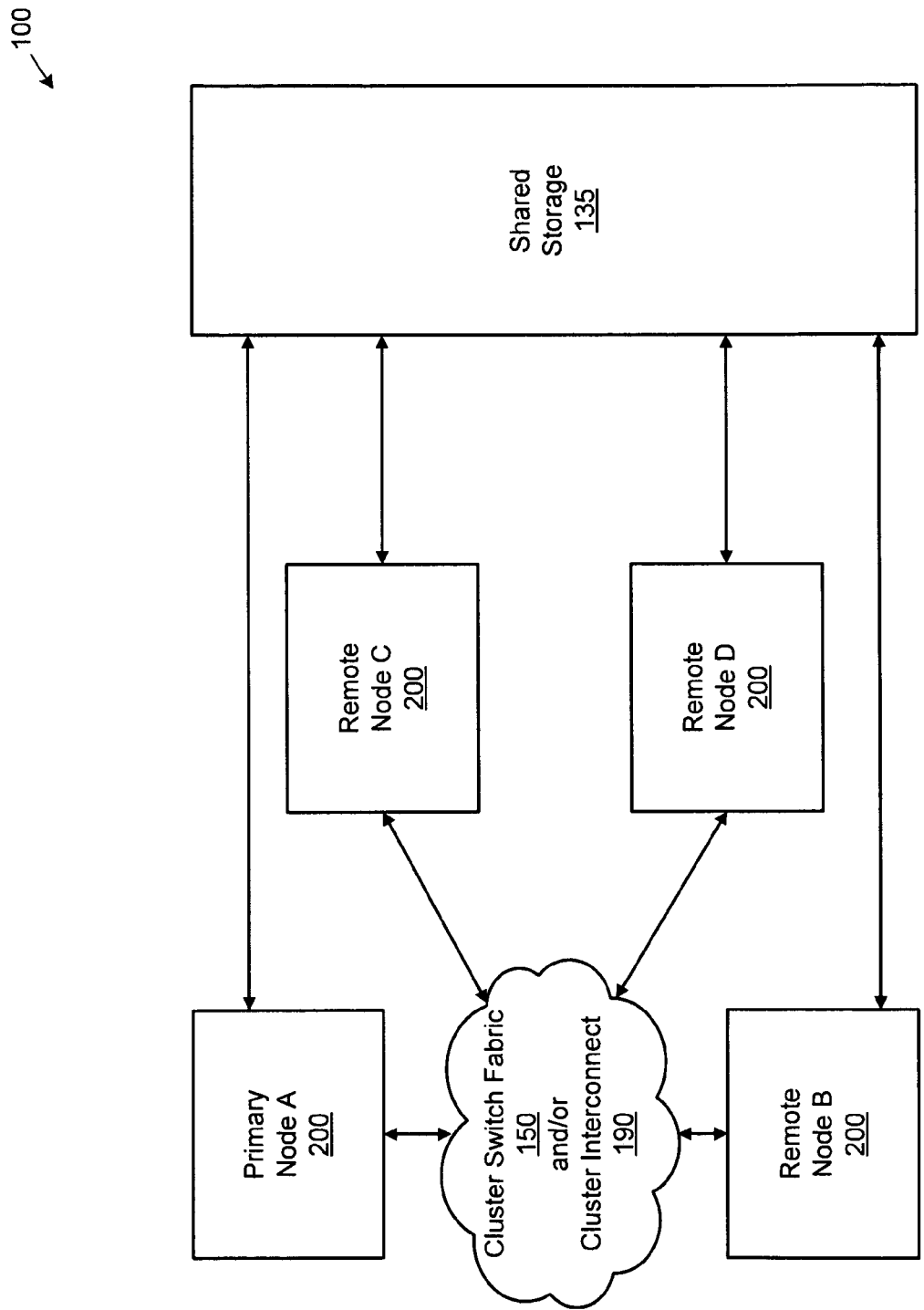

FIGS. 1A-B are schematic block diagrams of an exemplary cluster 100 environment in which some embodiments operate. A cluster 100 may comprise a plurality of interconnected nodes 200 configured to provide storage services for a set of storage devices comprising a shared storage 135. The nodes 200 may comprise various functional components that work in conjunction and cooperate to provide a distributed storage system architecture of the cluster 100.

As shown in FIG. 1A, each node 200 may be organized as a network element (N-module 310) and a disk element (D-module 350). The N-module 310 includes functionality that enables the node 200 to connect to clients 180 over a computer network 140, while each D-module 350 connects to one or more storage devices, such as disks 130 of a disk array 120. It should be noted that although disks 130 are used in some embodiments described below, any other type of storage device may be used as well. For example, a solid state storage device may be used instead, the solid state device having no mechanical moving parts for reading and writing data. Some examples of solid state devices include flash memory, non-volatile random access memory (NVRAM), Magnetic Random Access Memory (MRAM), Phase Change RAM (PRAM), etc. In other embodiments, other storage devices other than those mentioned here may also be used.

Also, it should be noted that while there is shown an equal number of N and D-modules in the illustrative cluster 100, there may be differing numbers of N and/or D-modules, and/or different types of modules implemented in the cluster 100 in accordance with various embodiments. For example, there may be a plurality of N-modules and/or D-modules interconnected in a cluster configuration 100 that does not reflect a one-to-one correspondence between the N and D-modules. As such, the description of a node 200 comprising one N-module and one D-module should be taken as illustrative only. For example, a node 200 may also have one N-module and a plurality of D-modules, a plurality of N-modules and one D-module, or a plurality of N-modules and a plurality of D-modules.

The nodes 200 are interconnected by a cluster switching fabric 150 which, in the illustrative embodiment, may be embodied as a Gigabit Ethernet switch. In other embodiments, the cluster switching fabric 150 may be embodied as another clustering network connection. An exemplary distributed file system architecture is generally described in U.S. Patent Application Publication No. US 2002/0116593, entitled METHOD AND SYSTEM FOR RESPONDING TO FILE SYSTEM REQUESTS, by M. Kazar et al. published Aug. 22, 2002.

In general, the nodes 200 in the cluster 100 may continually monitor each other to detect a failure of any node, e.g., by notifying one another of continued operation using a heartbeat signal passed between the nodes. If a partner node detects the absence of a heartbeat signal from a primary node, a failure is detected and a takeover procedure of the primary node may be initiated. In other embodiments, however, other techniques (other than use of heartbeat signals) are used to detect the failure of a node. A failure of a node may be caused by a variety of reasons, such as a software failure (e.g., failure of the N-module or D-module) or hardware failure. Also, note that a node 200 "failure" may occur unintentionally (e.g., where the heartbeat signal of a node is absent) or intentionally (e.g., where a node is taken offline for servicing by an administrator or a command to takeover a node is received from an administrator).

In general, the takeover of a node may be triggered/initiated for any variety of reasons. Upon determining an initiating event (e.g., detecting a node failure, receiving an administrative command, detecting a node performing a core dump, etc.), takeover of ownership of the aggregates of a "failed" node may be initiated. As such, in the embodiments described below, a "failed" node may be construed broadly to include any node where takeover of the aggregates owned by the node is triggered/initiated (for whatever reason). In some embodiments, when a takeover procedure of a "failed" node is triggered/initiated, two or more partner nodes of the cluster 100 assert ownership of the aggregates owned by the failed node according to an aggregate failover data structure (AFDS). After the takeover operation is complete, the data in the aggregates previously owned by the failed node are served and serviced by the two or more partner nodes until the failed node is brought online again and a giveback operation is performed to give ownership back to the previously failed node. In other embodiments, however, ownership may not be returned to the previously failed node.

In some embodiments, the nodes 200 may also be coupled across a cluster interconnect 190 which provides an additional communication path between the nodes. For example, the cluster interconnect 190 may be Fibre Channel (FC), InfiniBand or another suitable medium. The cluster interconnect 190 may be used for detecting the failure of a primary node by a partner node in the cluster 100. For example, the cluster interconnect 190 may be used to provide heartbeat signals between the nodes 200 for constantly monitoring the active/failure status of each node. Each primary node may continually send (e.g., through cluster interconnect 190) heartbeat signals to each of its partner nodes to continually indicate to the partner nodes that the primary node is in an active state. For example, a heartbeat signal may comprise a message with a sequence number that increments every time a heartbeat signal is sent. In the absence of a heartbeat signal from the primary node (for a longer time period than a predetermined time interval, whereby a heartbeat signal "time out" has occurred), a partner node may assume the primary node has failed (is in a failed state). As such, each node in the cluster may detect the failure of a partner node using the heartbeat signals.

In other embodiments, the cluster 100 may implement the cluster switching fabric 150 and/or the cluster interconnect 190 (as shown in FIG. 1B). In these embodiments, the heartbeat signals may be sent across the cluster switching fabric 150 (over which communications between an N-module and D-module are illustratively effected through remote message passing over the cluster switching fabric 150). As such, the failure of a primary node may be indicated by the absence of a heartbeat signal from the primary node from the cluster interconnect 190 and/or the cluster switching fabric 150. As described below, if the heartbeat signal of a primary node terminates (i.e., "times out"), then takeover and aggregate failover procedures for the primary node may be triggered/enabled.

The clients 180 may be general-purpose computers configured to interact with the node 200 in accordance with a client/server model of information delivery. That is, each client 180 may request the services of the node 200 (e.g., by submitting read/write requests), and the node 200 may return the results of the services requested by the client 180, by exchanging packets over the network 140. The client 180 may submit access requests by issuing packets using file-based access protocols, such as the Common Internet File System (CIFS) protocol or Network File System (NFS) protocol, over the Transmission Control Protocol/Internet Protocol (TCP/IP) when accessing information in the form of files and directories. Alternatively, the client may submit access requests by issuing packets using block-based access protocols, such as the Small Computer Systems Interface (SCSI) protocol encapsulated over TCP (iSCSI) and SCSI encapsulated over Fibre Channel (FCP), when accessing information in the form of blocks.

In some embodiments, a client 180 connects to a node 200 for a data-access session with the node 200. During a data-access session, the client 180 may submit access requests that are received and performed by the node 200. Such access requests may include storage state requests, a storage state request comprising a request that alters the data state of a storage device 130. Examples of storage state requests include requests for storing new data to a file, deleting a file, changing attributes of a file, etc. For illustrative purposes, storage state requests may be generically referred to herein as write requests.

In some embodiments, the totality of storage space provided by the disks 130 and disk arrays 120 of the cluster 100 comprise a total shared storage space (referred to as "shared storage 135") of the cluster 100. In other embodiments, the shared storage 135 comprises the totality of storage space provided by other types of storage devices (such as solid state storage devices). The shared storage 135 is accessible by each D-module 350 of each node 200 in the cluster 100. The shared storage 135 is discussed in detail in Section III. In some embodiments, the cluster 100 may provide high availability of service to clients 180 in accessing the shared storage 135. For example, the nodes 200 may be configured to communicate with one another (e.g., via cluster switching fabric 150) to act collectively to offset any single node 200 failure within the cluster 100. Each disk 130 in the shared storage 135 may store ownership information 132 at an on-disk ownership location 134. Ownership information 132 of a disk 130 may indicate which node or D-module within the cluster 100 has permission to access the disk 130 (i.e., "owns" the disk 130).

FIG. 1B shows an embodiment where a cluster 100 comprises three or more nodes, where each node 200 may have two or more predetermined failover partner nodes 200 (referred to as an "N-way system"). Each node 200 may have an associated identifier (ID) that uniquely identifies the node 200 within the cluster 100. Also, each D-module 350 may have an associated identifier (ID) that uniquely identifies the D-module 350 within the cluster 100. In some embodiments, the D-module ID of a D-module 350 may be the same as the node ID of the node in which the D-module 350 resides.

Each node is configured for providing data-access service to clients connected with the node. When a node 200 failure occurs (where the failed node is no longer capable of processing access requests for clients 180), the two or more partner nodes 200 are configured to automatically resume/takeover the data-access service functions provided by the failed node 200. As such, when a node failure occurs, access requests sent to the failed node 200 may be re-directed to the two or more partner nodes 200 for processing and execution.

As opposed to each node 200 having only a single partner node 200 where the entire additional workload (of the failed node) is imposed on a single partner node, the additional workload may thus be distributed among two or more partner nodes. A cluster 100 wherein a node 200 may have two or more predetermined failover partner nodes 200 may be referred to herein as an "N-way system." In some embodiments, each partner node takes over the workload of a failed primary node on a per aggregate basis (as discussed below). Various components of the nodes 200 described below may communicate through the cluster switching fabric 150 and/or cluster interconnect 190 to operate in conjunction to perform aggregate failover procedures described herein.

Figure 2:
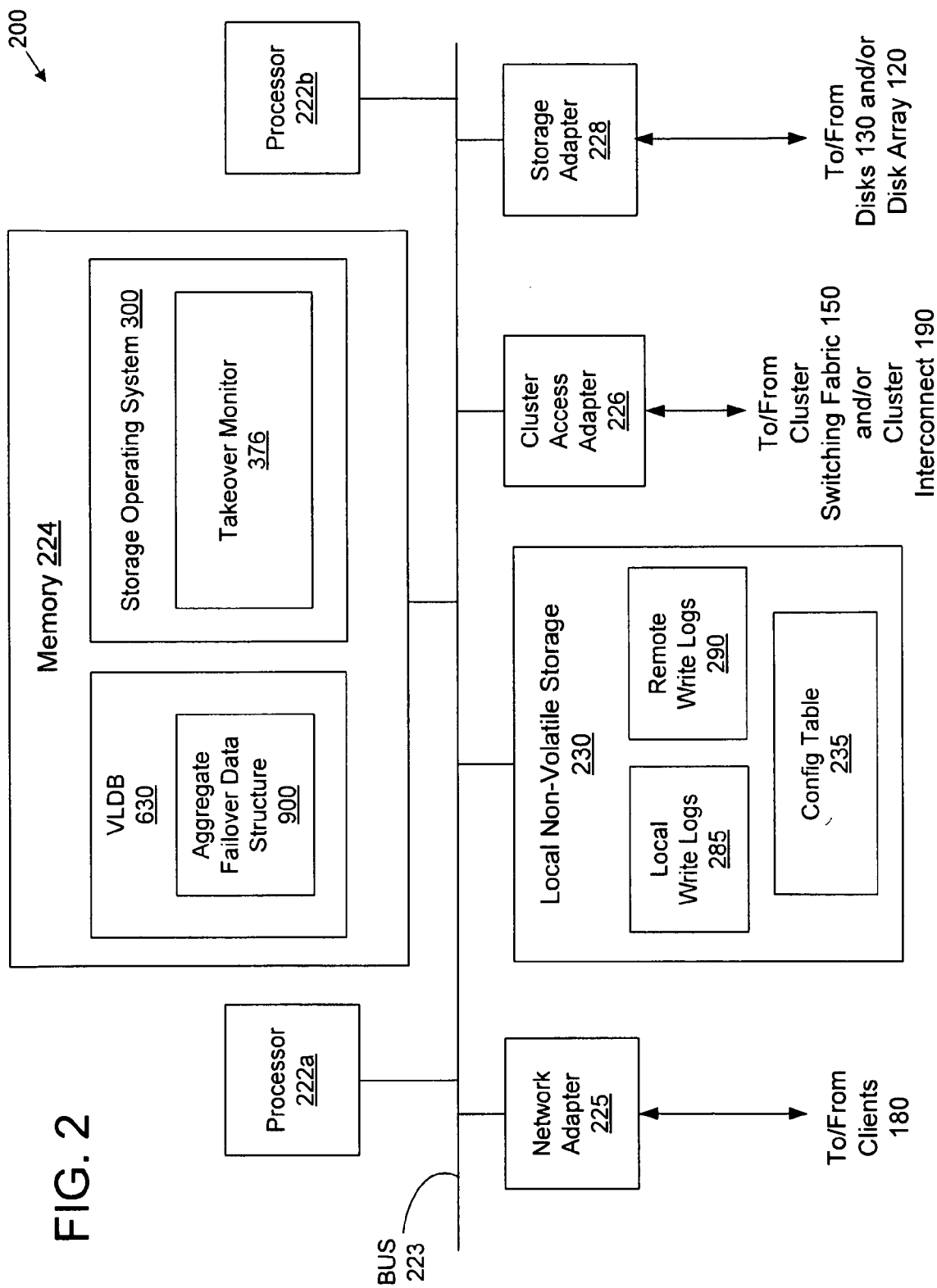
FIG. 2 is a schematic block diagram of an exemplary node that may be employed in the cluster environment.

FIG. 2 is a schematic block diagram of an exemplary node 200 that may be employed in the cluster environment of FIGS. 1A-B. A node 200 may be illustratively embodied as a storage system comprising a plurality of processors 222a,b, a memory 224, a network adapter 225, a cluster access adapter 226, a storage adapter 228, and local non-volatile storage device 230 interconnected by a system bus 223.

The cluster access adapter 226 comprises a plurality of ports adapted to couple the node 200 to other nodes of the cluster 100 (e.g., using the cluster switching fabric 150 and/or the cluster interconnect 190). In the illustrative embodiment, Ethernet is used as the clustering protocol and interconnect media, although it will be apparent to those skilled in the art that other types of protocols and interconnects may be utilized within the cluster architecture described herein. In alternate embodiments where the N-modules and D-modules are implemented on separate storage systems or computers, the cluster access adapter 226 is utilized by the N/D-module for communicating with other N/D-modules in the cluster 100.

Each node 200 is illustratively embodied as a dual processor storage system executing a storage operating system 300 that preferably implements a high-level module, such as a file system, to logically organize the information as a hierarchical structure of named data containers, such as directories, files and special types of files called virtual disks (hereinafter generally "blocks") on the disks. However, it will be apparent to those of ordinary skill in the art that the node 200 may alternatively comprise a single or more than two processor system. Illustratively, one processor 222a executes the functions of the N-module 310 on the node, while the other processor 222b executes the functions of the D-module 350.

The network adapter 225 comprises a plurality of ports adapted to couple the node 200 to one or more clients 180 over point-to-point links, wide area networks, virtual private networks implemented over a public network (Internet) or a shared local area network. The network adapter 225 thus may comprise the mechanical, electrical and signaling circuitry needed to connect the node to the network. Illustratively, the computer network 140 may be embodied as an Ethernet network or a Fibre Channel (FC) network. Each client 180 may communicate with the node 200 over the network 140 by exchanging discrete frames or packets of data according to pre-defined protocols, such as TCP/IP.

The storage adapter 228 cooperates with the storage operating system 300 executing on the node 200 to access information requested by the clients. The information may be stored on any type of attached array of writable storage device media such as video tape, optical, DVD, magnetic tape, bubble memory, electronic random access memory, micro-electro mechanical and any other similar media adapted to store information, including data and parity information. However, as illustratively described herein, the information is preferably stored on the disks 130 of array 120. The storage adapter comprises a plurality of ports having input/output (I/O) interface circuitry that couples to the disks over an I/O interconnect arrangement, such as a conventional high-performance, FC link topology.

Storage of information on each array 120 is preferably implemented as one or more storage "volumes" that comprise a collection of physical storage disks 130 cooperating to define an overall logical arrangement of volume block number (vbn) space on the volume(s). Each logical volume is generally, although not necessarily, associated with its own file system. The disks within a logical volume/file system are typically organized as one or more groups, wherein each group may be operated as a Redundant Array of Independent (or Inexpensive) Disks (RAID). Most RAID implementations, such as a RAID-4 level implementation, enhance the reliability/integrity of data storage through the redundant writing of data "stripes" across a given number of physical disks in the RAID group, and the appropriate storing of parity information with respect to the striped data. An illustrative example of a RAID implementation is a RAID-4 level implementation, although it should be understood that other types and levels of RAID implementations may be used in accordance with the inventive principles described herein.

The memory 224 illustratively comprises storage locations that are addressable by the processors and adapters for storing software program code and data used in some embodiments. The processors and adapters may, in turn, comprise processing elements and/or logic circuitry configured to execute the software code and manipulate the data stored in the memory 224. In some embodiments, the memory 224 may comprise a form of random access memory (RAM) comprising "volatile" memory that is generally cleared by a power cycle or other reboot operation.

The storage operating system 300, portions of which is typically resident in memory and executed by the processing elements, functionally organizes the node 200 by, inter alia, invoking storage operations in support of the storage services implemented by the node. It will be apparent to those skilled in the art that other processing and memory means, including various computer readable media, may be used for storing and executing program instructions pertaining to embodiments described herein. In some embodiments, the storage operating system 300 comprises a plurality of software layers/engines (including a takeover monitor module/engine 376) that are executed by the processors. In some embodiments, a software layer or a module (e.g., takeover monitor module 376) may comprise an engine comprising firmware or software and hardware configured to perform embodiments described herein. In general, functions of a software layer or module described herein may be embodied directly in hardware, or embodied as software executed by a processor, or embodied as a combination of the two. In some embodiments, the takeover monitor modules/engines of the nodes 200 of a cluster 100 operate in conjunction to takeover aggregates of a failed node on a per aggregate basis. As discussed below, a takeover monitor module/engine 376 may do so using an aggregate failover data structure (AFDS) 900 that is loaded and stored to memory 224.

The local non-volatile storage device 230 may comprise one or more storage devices (such as disks or solid state devices) utilized by the node to locally store configuration information (e.g., in configuration table 235) provided by one or more management processes that execute as user mode applications. Alternatively, such information may be stored remotely. The local non-volatile storage device 230 that may be employed as a backup memory that ensures that the storage system does not "lose" received information, e.g., CIFS and NFS requests, in the event of a system shutdown or other unforeseen problem. In some embodiments, the non-volatile storage device 230 may comprise a rewritable computer memory for storing data that does not require power to maintain data/information stored in the computer memory and may be electrically erased and reprogrammed. Some examples of non-volatile storage devices include flash memory, non-volatile random access memory (NVRAM), Magnetic Random Access Memory (MRAM), Phase Change RAM (PRAM), etc. In other embodiments, other non-volatile storage devices are used other than those listed here. As discussed below, the local non-volatile storage device 230 may store local write logs 285 and remote write logs 290.

II. Storage Operating System

To facilitate access to the disks 130, the storage operating system 300 implements a write-anywhere file system that cooperates with one or more virtualization modules to "virtualize" the storage space provided by disks 130. The file system logically organizes the information as a hierarchical structure of named directories and files on the disks. Each "on-disk" file may be implemented as set of disk blocks configured to store information, such as data, whereas the directory may be implemented as a specially formatted file in which names and links to other files and directories are stored. The virtualization module(s) allow the file system to further logically organize information as a hierarchical structure of blocks on the disks that are exported as named logical unit numbers (luns).

In the illustrative embodiment, the storage operating system is preferably the Data ONTAP® software operating system available from NetApp, Inc., Sunnyvale, California that implements a Write Anywhere File Layout (WAFL®) file system. However, it is expressly contemplated that any appropriate storage operating system may be enhanced for use in accordance with the inventive principles described herein. As such, where the term "WAFL" is employed, it should be taken broadly to refer to any storage operating system that is otherwise adaptable to the teachings of the embodiments herein.

A. Software Layers of Storage Operating System

Figure 3:
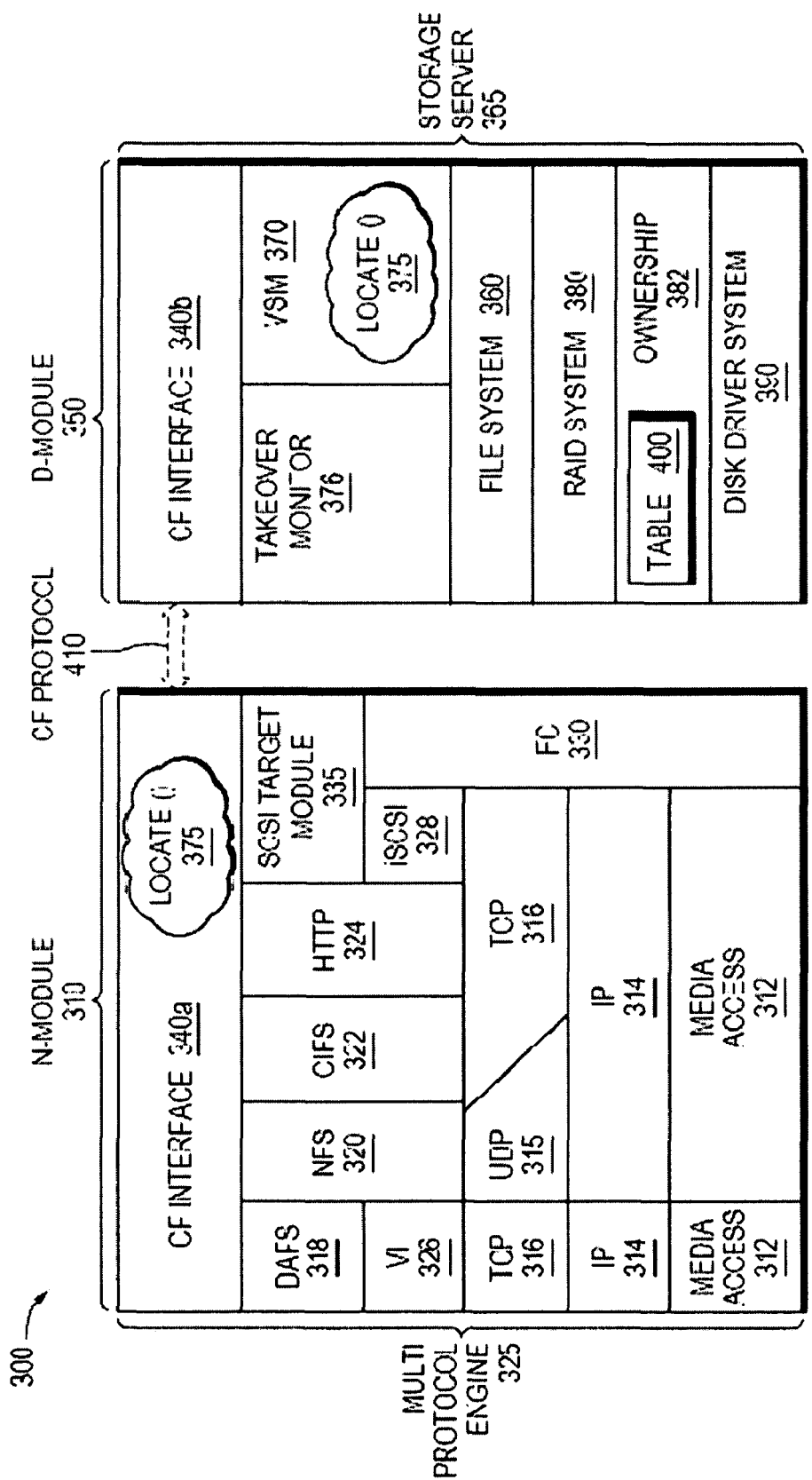
FIG. 3 is a schematic block diagram of an exemplary storage operating system that may be implemented by the node in FIG. 2.

FIG. 3 is a schematic block diagram of the storage operating system 300 that may be implemented by the node 200 in FIG. 2. The storage operating system 300 comprises a series of software layers organized to form an integrated network protocol stack or, more generally, a multi-protocol engine 325 (N-module 310) that provides data paths for clients 180 to access data stored on the node 200 using block and file access protocols. The multi-protocol engine 325 includes a media access layer 312 of network drivers (e.g., gigabit Ethernet drivers) that interfaces to network protocol layers, such as the IP layer 314 and its supporting transport mechanisms, the TCP layer 316 and the User Datagram Protocol (UDP) layer 315.

A file system protocol layer provides multi-protocol file access and, to that end, includes support for the Direct Access File System (DAFS) protocol 318, the NFS protocol 320, the CIFS protocol 322 and the Hypertext Transfer Protocol (HTTP) protocol 324. A VI layer 326 implements the VI architecture to provide direct access transport (DAT) capabilities, such as RDMA, as required by the DAFS protocol 318. An iSCSI driver layer 328 provides block protocol access over the TCP/IP network protocol layers, while a FC driver layer 330 receives and transmits block access requests and responses to and from the node. The FC and iSCSI drivers provide FC-specific and iSCSI-specific access control to the blocks and, thus, manage exports of luns to either iSCSI or FCP or, alternatively, to both iSCSI and FCP when accessing the blocks on the node 200.

In addition, the storage operating system includes a series of software layers organized to form a storage server 365 (D-module 350) that provides data paths for accessing data stored on the disks 130 of the node 200. The file system module 360 interacts in cooperating relation with a volume striping module (VSM) 370, a RAID system module 380 and a disk driver system module 390. The RAID system 380 manages the storage and retrieval of information to and from the volumes/disks in accordance with I/O operations, while the disk driver system 390 implements a disk access protocol such as, e.g., the Small Computer System Interface (SCSI) protocol. However, it should be understood that processes other than the RAID system 380 may in other embodiments perform such tasks while remaining within the scope of the present invention.

The VSM 370 illustratively implements a striped volume set (SVS) and, as such cooperates with the file system 360 to enable storage server 365 to service a volume of the SVS. In particular, the VSM 370 implements a Locate( ) function 375 to compute the location of data container content in the SVS volume to thereby ensure consistency of such content served by the cluster.

B. Disk Ownership

A disk ownership module 382 manages ownership of the disks with respect to their related aggregates and volumes using, for example, one or more data structures such as tables, including, for example, the disk ownership table 400. In particular, the ownership module 382 cooperates with the disk driver system 390 to identify the appropriate D-module for processing data access requests for particular volumes on the disk array 120. To that end, the ownership module consults disk ownership table 400, which contains disk ownership information that is illustratively generated at boot-up time, and that is updated by various components of the storage operating system to reflect changes in ownership of disks. Further details regarding the data structure implemented as ownership table 400 are provided in U.S. patent application Ser. No. 11/606,727, filed on Nov. 30, 2006, entitled "SYSTEM AND METHOD FOR STORAGE TAKEOVER," by Susan M. Coatney et al., which is incorporated herein by reference. Notably, the disk ownership module 382 includes program instructions for writing proper ownership information 132 at a proper location 134 on each disk (as shown in FIG. 1A). Ownership information 132 of a disk 130 may indicate which node or D-module within the cluster 100 has permission to access the disk 130 (i.e., "owns" the disk 130). The disk ownership module 382 may do so using SCSI reservation tags (discussed in detail in above referenced U.S. patent application Ser. No. 11/606,727).

The disk ownership table 400, which is maintained by the ownership module 382 of the storage operating system 300, may comprise a plurality of entries, one for each disk in the shared storage 135. Fields of an entry may include a drive identification field, a world wide name field, ownership information field and a field for other information. The world wide name is an identification number which is unique for every item attached to a fibre channel network. Initially, the disk ownership table 400 is generated upon boot up of the system. More specifically, I/O services of the disk driver system 390 query all devices (e.g., disks 130) attached to the system. This query requests information as to the nature of the attached disks. Upon completion of the query, the ownership module 382 instructs the disk driver system 390 to read the ownership information from each disk. In response, the disk driver system reads the ownership information 132 for each disk 130 from each on-disk ownership location 134 (FIG. 1A), and then the ownership module 382 creates the entries in the disk ownership table 400 with this information.

The ownership information 132 of a disk 130 may include "home owner" and "current owner" information. The "home owner" of a disk 130 may identify a node that is assigned to service data of the disk under normal operating conditions where no nodes have failed in the cluster. As such, the "home owner" of a disk 130 may indicate a node that is the permanent or indefinite owner of the disk 130 until the node fails. The "current owner" of a disk 130 may identify a node that is assigned to temporarily service data of the disk when a node that is the home owner of the disk has failed. As such, the "current owner" of a disk 130 may indicate a node that is the temporary owner of the disk 130 until the failed node has been brought back online and is again in an active state.

Subsequently, the ownership module 382 accesses the disk ownership table 400 to extract the identification of all disks that are owned by the appropriate D-module. The ownership module then verifies the SCSI reservations on each disk owned by that D-module by reading the ownership information stored in the ownership location on each disk. If the SCSI reservations and on-disk information do not match, the ownership module changes the SCSI reservation to match the on-disk ownership information. Once the SCSI reservations and on-disk ownership information match for all disks identified as owned by the D-module, the ownership module 382 then passes the information to the file system and the RAID module, which configure the individual disks into the appropriate RAID groups and volumes for the D-module 350.

C. Takeover Monitor Module

Referring again to FIG. 3, the storage operating system 300 also comprises a takeover monitor module 376 that operates in conjunction with the other software layers of the storage operating system 300 to takeover a failed node as described herein. In some embodiments, the takeover monitor 376 may be pre-included in storage operating system 300 software. In other embodiments, the takeover monitor 376 may comprise an external auxiliary plug-in type software module that works with the storage operating system 300 to enhance its functions. In some embodiments, the takeover monitor 376 may reside between the CF Interface 340 and the file system layer 360 of the storage operating system 300 (as shown in FIG. 3). In other embodiments, the takeover monitor 376 may reside near other layers of the storage operating system 300. The takeover monitor module 376 may maintain and update data structures such as VLDB 630 and AFDS 900 (FIG. 2) used for taking over a failed node on a per aggregate basis. A takeover monitor 376 may reside and execute on each node 200 of the cluster 100. The takeover monitors 376 in the nodes 200 may be configured to communicate and operate in conjunction with each other to perform the techniques described herein. As used herein, a local/primary node may comprise a "local" takeover monitor 376 and a remote/partner node may comprise a "remote" takeover monitor 376.

To detect a node failure, the takeover monitor module 376 may operate in conjunction with a cluster fabric (CF) interface module 340b to monitor the heartbeat signals between a primary node and the partner nodes in the cluster. The takeover monitor modules 376 residing and executing on the various nodes 200 may operate in conjunction to determine if any node 200 in the cluster 100 has failed. If the absence of a heartbeat signal from a primary node is detected (and thus failure of the primary node is determined), the takeover monitor module 376 residing and executing on a partner node may initiate/trigger the takeover procedure for the failed primary node. The takeover procedure for a primary node may also be initiated/triggered intentionally, e.g., by a node takeover command issued by an administrator (whereby the takeover monitor 376 is responsive to the node takeover command). In general, the takeover of a node may be triggered/initiated for any variety of reasons. Upon determining an initiating event (e.g., detecting a node failure, receiving an administrative command, detecting a node performing a core dump, etc.), takeover of ownership of the aggregates of a "failed" node may be initiated. As such, in the embodiments described below, a "failed" node may be construed broadly to include any node where takeover of the aggregates owned by the node is triggered/initiated (for whatever reason).

In response to detecting a lack of a heartbeat signal from the primary node or the receiving of a node takeover command for the primary node, a takeover procedure of the primary node is initiated/triggered by the takeover monitor module 376 residing on a partner node. In some embodiments, the takeover monitor modules 376 residing on two or more partner nodes of a failed primary node each initiate takeover procedures of the primary node on a per aggregate basis. In these embodiments, each takeover monitor modules 376 residing on a partner node begins takeover procedures for taking over an assigned aggregate sub-set owned by the failed primary node. As such, the aggregate set owned by the failed primary node are taken over by two or more partner nodes.

Each takeover monitor module 376 of a partner node may refer to an aggregate failover data structure (AFDS) to determine which partner node takes over which aggregate sub-set of a failed node. In some embodiments, each node may maintain its own copy of the AFDS 900 (e.g., the AFDS 900 may be stored and maintained in the VLDB 630). In performing the takeover of an aggregate sub-set of the primary node, the takeover monitor module 376 may operate in conjunction with other software layers and modules residing on the partner node 200, such as the file system 360, the RAID system 380, the ownership module 382 and the disk driver system 390, instructing each to perform particular routines/threads to implement the takeover procedures. The procedures for taking over the aggregates of the failed node are described below in relation to FIGS. 10 and 11.

D. File System

The file system 360 implements a virtualization system of the storage operating system 300 through the interaction with one or more virtualization modules illustratively embodied as, e.g., a virtual disk (vdisk) module (not shown) and a SCSI target module 335. The vdisk module enables access by administrative interfaces in response to a user (system administrator) issuing commands (e.g., node takeover command) to the node 200. The SCSI target module 335 is generally disposed between the FC and iSCSI drivers 328, 330 and the file system 360 to provide a translation layer of the virtualization system between the block (lun) space and the file system space, where luns are represented as blocks.

The file system 360 is illustratively a message-based system that provides logical volume management capabilities for use in access to the information stored on the storage devices, such as disks. That is, in addition to providing file system semantics, the file system 360 provides functions normally associated with a volume manager. These functions include (i) aggregation of the disks, (ii) aggregation of storage bandwidth of the disks, and (iii) reliability guarantees, such as mirroring and/or parity (RAID). The file system 360 illustratively implements the WAFL® file system (hereinafter generally the "write-anywhere file system") having an on-disk format representation that is block-based using, e.g., 4 kilobyte (kB) blocks and using index nodes ("inodes") to identify files and file attributes (such as creation time, access permissions, size and block location). The file system uses files to store metadata describing the layout of its file system; these metadata files include, among others, an inode file. A file handle, i.e., an identifier that includes an inode number, is used to retrieve an inode from disk.

Broadly stated, all inodes of the write-anywhere file system are organized into the inode file. A file system (fs) info block specifies the layout of information in the file system and includes an inode of a file that includes all other inodes of the file system. Each logical volume (file system) has an fsinfo block that is preferably stored at a fixed location within, e.g., a RAID group. The inode of the inode file may directly reference (point to) data blocks of the inode file or may reference indirect blocks of the inode file that, in turn, reference data blocks of the inode file. Within each data block of the inode file are embedded inodes, each of which may reference indirect blocks that, in turn, reference data blocks of a file.

Operationally, an access request (read/write request) from the client 180 is forwarded as a packet over the computer network 140 and onto the node 200 where it is received at the network adapter 225. A network driver (of layer 312 or layer 330) processes the packet and, if appropriate, passes it on to a network protocol and file access layer for additional processing prior to forwarding to the write-anywhere file system 360. Here, the file system produces operations to load (retrieve) the requested data from disk 130 if it is not resident "in core", i.e., in memory 224. If the information is not in memory, the file system 360 indexes into the inode file using the inode number to access an appropriate entry and retrieve a logical vbn. The file system then passes a message structure including the logical vbn to the RAID system 380; the logical vbn is mapped to a disk identifier and disk block number (disk,dbn) and sent to an appropriate driver (e.g., SCSI) of the disk driver system 390. The disk driver accesses the dbn from the specified disk 130 and loads the requested data block(s) in memory for processing by the node. Upon completion of the access request, the node 200 (and storage operating system 300) returns a reply to the client 180 over the network 140.

E. Storage Operating System Implementations

It should be noted that the software "path" through the storage operating system layers described above needed to perform data storage access for the client request received at the node may alternatively be implemented in hardware. That is, in an alternative embodiment, a storage access request data path may be implemented as logic circuitry embodied within a field programmable gate array (FPGA) or an application specific integrated circuit (ASIC). This type of hardware implementation increases the performance of the storage service provided by node 200 in response to a request issued by client 180. Moreover, in another alternate embodiment of the invention, the processing elements of adapters 225, 228 may be configured to offload some or all of the packet processing and storage access operations, respectively, from processor 222, to thereby increase the performance of the storage service provided by the node. It is expressly contemplated that the various processes, architectures and procedures described herein can be implemented in hardware, firmware or software.

As used herein, the term "storage operating system" generally refers to the computer-executable code operable on a computer to perform a storage function that manages data access and may, in the case of a node 200, implement data access semantics of a general purpose operating system. The storage operating system 300 can also be implemented as a microkernel, an application program operating over a general-purpose operating system, such as UNIX® or Windows NT®, or as a general-purpose operating system with configurable functionality, which is configured for storage applications as described herein.

In addition, it will be understood to those skilled in the art that the invention described herein may apply to any type of special-purpose (e.g., file server, filer or storage serving appliance) or general-purpose computer, including a standalone computer or portion thereof, embodied as or including a storage system. Moreover, the teachings of this invention can be adapted to a variety of storage system architectures including, but not limited to, a network-attached storage environment, a storage area network and disk assembly directly-attached to a client or host computer. The term "storage system" should therefore be taken broadly to include such arrangements in addition to any subsystems configured to perform a storage function and associated with other equipment or systems. It should be noted that while this description is written in terms of a write anywhere file system, the teachings of the present invention may be utilized with any suitable file system, including a write in place file system.

F. N-Module and D-Module

In the illustrative embodiment, the storage server 365 is embodied as D-module 350 of the storage operating system 300 to service one or more volumes of array 120. In addition, the multi-protocol engine 325 is embodied as N-module 310 to (i) perform protocol termination with respect to a client issuing incoming data access request packets over the network 140, as well as (ii) redirect those data access requests to any storage server 365 of the cluster 100. Moreover, the N-module 310 and D-module 350 cooperate to provide a highly-scalable, distributed storage system architecture of the cluster 100. To that end, each module includes a CF interface module 340a,b adapted to implement intra-cluster communication among the N- and D-modules, including D-module-to-D-module communication for data container striping operations.

The protocol layers, e.g., the NFS/CIFS layers and the iSCSI/FC layers, of the N-module 310 function as protocol servers that translate file-based and block-based data access requests from clients into CF protocol messages used for communication with the D-module 350. That is, the N-module servers convert the incoming data access requests into file system primitive operations (commands) that are embedded within CF messages by the CF interface module 340 for transmission to the D-modules 350 of the cluster 100. Notably, the CF interface modules 340 cooperate to provide a single file system image across all D-modules 350 in the cluster 100. Thus, any network port of an N-module that receives a client request can access any data container within the single file system image located on any D-module 350 of the cluster.

G. CF Messages

In some embodiments, the N-module 310 and D-module 350 are implemented as separately-scheduled processes of storage operating system 300. In other embodiments, the N-module 310 and D-module 350 may be implemented as separate software components/code within a single operating system process. Communication between an N-module and D-module in the same node 200 is thus illustratively effected through the use of CF messages passing between the modules. In the case of remote communication between an N-module and D-module of different nodes, such CF message passing occurs over the cluster switching fabric 150. As noted, the cluster switching fabric 150 may be used as a second medium over which heartbeat signals between the nodes are transmitted and received through the cluster interconnect 190.

A known message-passing mechanism provided by the storage operating system to transfer information between modules (processes) is the Inter Process Communication (IPC) mechanism. The protocol used with the IPC mechanism is illustratively a generic file and/or block-based "agnostic" CF protocol that comprises a collection of methods/functions constituting a CF application programming interface (API). Examples of such an agnostic protocol are the SpinFS and SpinNP protocols available from NetApp, Inc. The SpinFS protocol is described in the above-referenced U.S. Patent Application Publication No. US 2002/0116593.

The CF interface module 340 implements the CF protocol for communicating file system commands/messages among the modules of cluster 100. Communication is illustratively effected by the D-module exposing the CF API to which an N-module (or another D-module) issues calls. To that end, the CF interface module 340 is organized as a CF encoder and CF decoder. The CF encoder of, e.g., CF interface 340a on N-module 310 encapsulates a CF message as (i) a local procedure call (LPC) when communicating a file system command to a D-module 350 residing on the same node 200 or (ii) a remote procedure call (RPC) when communicating the command to a D-module residing on a remote node of the cluster 100. In either case, the CF decoder of CF interface 340b on D-module 350 de-encapsulates the CF message and processes the file system command. As used herein, the term "CF message" may be used generally to refer to LPC and RPC communication between modules of the cluster. Further detail regarding CF messages is described in the above-referenced U.S. patent application Ser. No. 11/606,727.

H. Write Logs

In general, during a data-access session with a node 200, a client 180 may submit access requests (read/write requests) that are received and performed by the node 200. For the received write requests, each node 200 may perform write requests in two stages. In a first stage, a primary node 200 may receive write requests and produce a write log for each received write request. The write logs may be stored to a local memory device. Write logs may be sometimes referred to herein as "NVRAM logs." In a second stage, upon occurrence of a predetermined initiating event (referred to as a "consistency point"), accumulated write logs stored in the local memory device may be performed on the storage devices 130 (whereby the received blocks of data are written to the storage devices).

In particular, in each node 200, the file system 360 may be configured to receive write requests for files and perform the received write requests in two stages. In the first stage, write requests are received by the file system layer 360, whereby a write request may contain blocks of data to be written. The file system 360 produces a write log for each received write request, the write log representing the write request and containing the blocks of data to be written. As used herein, a primary node produces "local write logs" 285 that may be stored locally to a non-volatile memory device, for example, to the local non-volatile storage 230 (as shown in FIG. 2).

To ensure data consistency, the write logs of the primary node 200 may also be stored remotely to a non-volatile storage device (e.g., non-volatile storage 230) at each partner node 200 in the cluster 100. Copies of the write logs of the primary node may be distributed remotely to each partner node for storage. As such, if the local/primary node fails, each remote/partner node will have a copy of the write logs of the primary node and will still be able to perform the write logs on the storage devices 130 if the primary node fails. If the write logs (of the failed primary node) stored at a partner node 200 is corrupted or lost, the write logs stored locally in the non-volatile storage device at the primary node can be extracted/retrieved and used by the remote partner node to perform the write logs on the storage devices. As used herein, a primary node receives "remote write logs" 290 from each remote partner node and stores the remote write logs 290 to a local non-volatile storage device 230 (as shown in FIG. 2), so that the remote write logs 290 may represent copies of all write logs of the partner nodes of the primary node.

In a second stage, upon occurrence of a predetermined initiating event (referred to as a "consistency point") at the primary node, accumulated local write logs 285 stored in the local volatile memory device may be performed on the storage devices 130 (e.g., whereby the received blocks of data are written to the storage devices). To do so, the accumulated local write logs 285 may be sent to the RAID system layer 380 that then performs the write logs (e.g., by writing the blocks of data in the write logs to a storage device). The consistency point may be initiated by various predetermined initiating events such as the occurrence of a predetermined time interval, the storage size of the accumulated local write logs 285 reaching a predetermined threshold size, etc. Note that the consistency point may be initiated at different times for each node 200 in the cluster 100.

After the second stage is initiated at the consistency point, after a write log is performed on a storage device, the write log is committed to disk and thus may be deleted. As such, after the accumulated local write logs 285 are performed at the consistency point, the local write logs 285 may then be deleted from volatile memory 224. The local write logs 285 produced for the local write logs 285 may also be deleted from non-volatile storage 230. Also, the local write logs 285 distributed/transferred to the remote partner nodes (and stored as remote write logs 290) may also be deleted from the non-volatile storages 230 of the remote partner nodes. After the consistency point, the process repeats as new write logs are produced for new received write requests, the new write logs being processed by the file system 360.

The nodes 200 may issue CF messages (via the cluster switching fabric 150) or other commands to each other to transfer/send write logs from one node to another or to delete write logs stored on a remote node (after the write logs are performed and no longer needed). The nodes 200 may also transfer the actual write logs from one node to another via the cluster switching fabric 150. For example, for sending write logs, the file system 360 on a primary node may send a CF message to the file system 360 on a remote partner node to prepare to receive write logs. The file system 360 on the primary node may then begin sending the write logs to the file system 360 on the remote partner node through the cluster switching fabric 150. The file system 360 on the remote partner node may then receive and store the write logs to its local non-volatile storage device 230. For example, for deleting write logs of the primary node (after the write logs have been performed by the primary node), the file system 360 on the primary node may send a CF message to the file system 360 on a remote partner node to delete particular write logs that have been performed. The file system 360 on the remote partner node may then delete the particular write logs from its local non-volatile storage device 230.

III. Shared Storage

As discussed above, in relation to FIGS. 1A-B, the totality of storage space provided by the disks 130 and disk arrays 120 of the cluster 100 comprise a total shared storage space (referred to as "shared storage 135") of the cluster 100. The shared storage 135 is accessible by each D-module 350 of each node 200 in the cluster 100. Referring to FIG. 1B, for illustrative purposes, node A may be referred to as the local/primary node that may experience a failure, primary node A having two or more remote partner nodes (such as remote partner nodes B, C, and D) that are configured to assume the workload of the primary node A upon failure.

Figure 4:
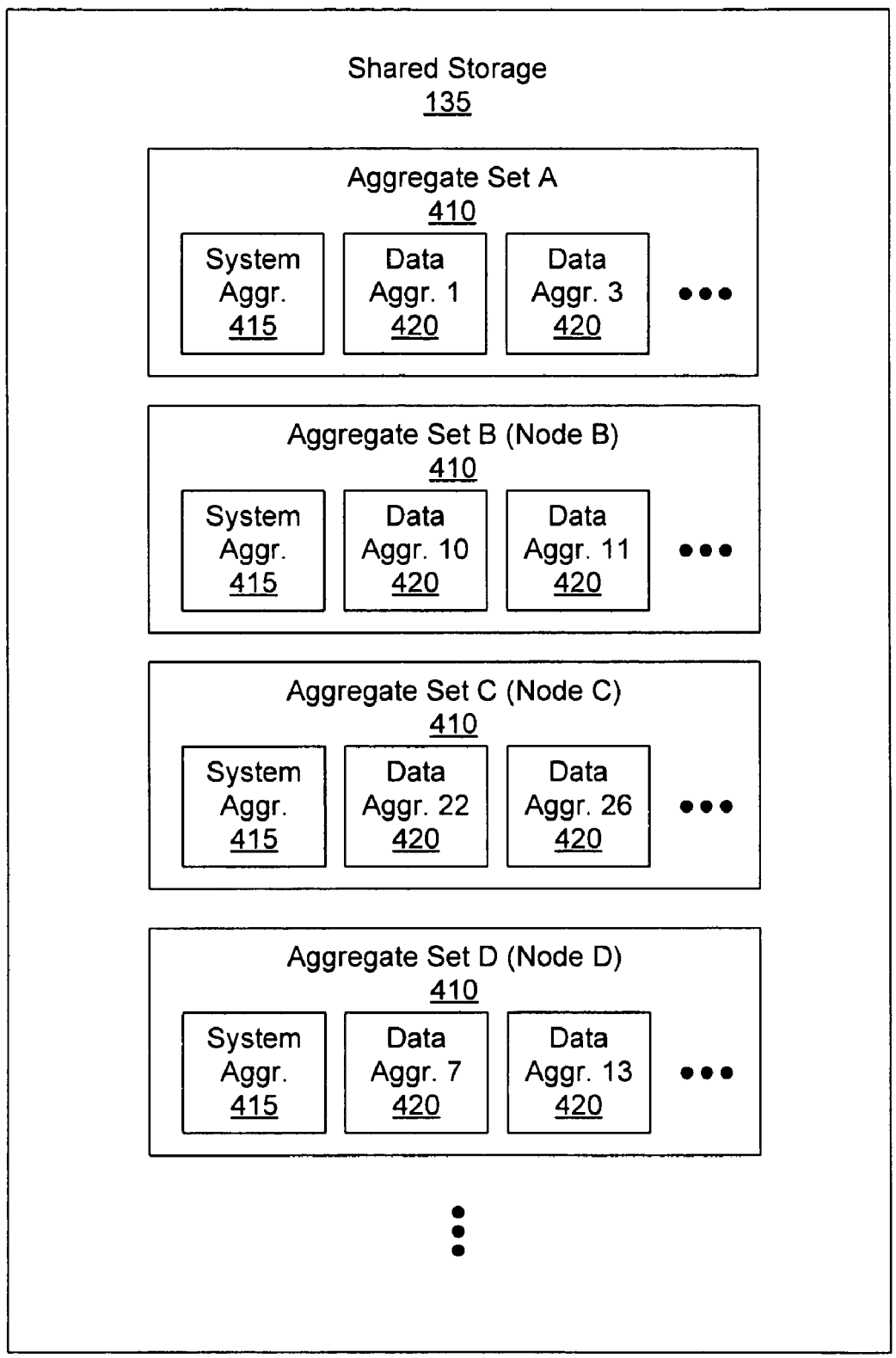
FIG. 4 shows a conceptual diagram of an exemplary shared storage comprising a plurality of aggregates.

FIG. 4 shows a conceptual diagram of an exemplary shared storage 135 of the cluster environment 100 of FIG. 1B. As shown in FIG. 4, the exemplary shared storage 135 comprises a plurality of aggregates, each aggregate comprising a sub-portion of the total available storage space of the shared storage 135. Each aggregate in the shared storage 135 may have an associated identifier (ID) that uniquely identifies the aggregate within the shared storage 135. In these embodiments, each node 200 of the cluster 100 is assigned/associated with a set of aggregates 410 ("aggregate set") in the shared storage 135. For example, node A may be assigned/associated with "Aggregate Set A," node B may be assigned/associated with "Aggregate Set B," etc. Each aggregate set may be used for serving and storing client data for the associated node 200. A node "owns" its assigned aggregate set within the shared storage 135 and serves/services data stored on the owned/assigned aggregate set.

In some embodiments, each node 200 owns an aggregate set 410 that comprises a system aggregate 415 and a plurality of data aggregates 420. Each system aggregate 415 may be used for storing local system information for the associated node 200. Such system information may include a volume location database (VLDB) 630 having information for mapping data containers to nodes that own the data containers within the cluster 100 (discussed further below). Although described as a database in some embodiments, the VLDB 630 may comprise any data structure in any variety of forms (e.g., table, list, database, etc.). As used herein, the VLDB 630 owned by a particular node 200 may be referred to as a "local" VLDB 630 of the particular node 200. In some embodiments, VLDB 630 also includes an aggregate failover data structure (AFDS) 900 that lists, for each node in the cluster 100, aggregate sub-sets owned by the node and one or more partner nodes assigned to takeover each aggregate sub-set (discussed further below). For example, the VLDB 630 and AFDS 900 may be stored to a root volume in the system aggregate 415, where upon boot/startup of the node 200, the VLDB 630 and AFDS 900 may be loaded and stored to memory 224 (as shown in FIG. 2).

As such, each node 200 may access, maintain, and store its own separate local copy of the VLDB 630 and AFDS 900 in a system aggregate 415 in the shared storage 135 owned by the node 200. In some embodiments, takeover of the aggregate set of a primary node is performed based on the AFDS 900 which specifies which partner node is to take over which aggregate sub-set (data aggregates 420) of the primary node. After takeover of the aggregate set of the primary node by the partner nodes, the VLDB 630 in each system aggregate 415 for each node 200 is updated in the shared storage 135 to reflect which partner nodes now own which data aggregates 420 of the primary node.

Each data aggregate 420 may be used for storing client data for the associated node 200, whereby clients 180 may read and write to the data aggregate 420. In some embodiments, upon a takeover of a primary node, the partner nodes takeover the data aggregates 420 owned by the primary node (and not the system aggregate 415 owned by the primary node). In some embodiments, each node owns a set of two or more data aggregates 420 (aggregate set) in the shared storage, the aggregate set being sub-divided into two or more sub-sets of data aggregates ("aggregate sub-sets"). Each aggregate sub-set may comprise one or more data aggregates 420 owned by the primary node.

In normal operation (when node failures have not occurred), the D-module 350 of each node 200 may be configured to access only the aggregate set assigned to the node 200 that it owns. For example, in normal operation, the D-module 350 of node A may be configured to access and serve data from only aggregate set A and the D-module 350 of node B may be configured to access and serve data from only aggregate set B. Therefore, in normal operation, all access requests (received at any N-module 310 of any node 200 in the cluster) for data stored in aggregate set A are routed through the D-module 350 of node A (and have physical addresses/file handles that specify the D-module 350 of node A). Note that the N-module 310 of each node can receive access requests for data in any aggregate 410 of the shared storage 135, and will route the access requests to the appropriate D-module 350 that services the requested data.

In the event of a node failure, the failed node is no longer capable of processing access requests (read/write requests) from clients 180 for data in the aggregate set assigned to the failed node. In such an event, the access requests sent to the failed node 200 may be re-directed to the two or more remote partner nodes 200 for processing. The remote partner nodes 200 of the failed node may be configured to collectively replace the failed node by accessing and serving data in the aggregate set assigned to the failed node (as well as the accessing and serving data in its own assigned aggregate). As such, upon failure of a node, "ownership" of the aggregate set assigned to the failed node may be transferred to the partner nodes (so that servicing of data for the aggregate set of the failed node may be taken over by the partner nodes). For example, upon failure of primary node A, remote partner nodes B, C, and D may each be configured to access and serve data stored in aggregate set A (whereas under normal operating conditions, the remote partner nodes B, C, and D would not have access to or serve data from aggregate set A). In some embodiments, upon failure of the primary node, each of the two or more partner nodes takes over ownership and servicing of an aggregate sub-set of the failed primary node. Thus, the additional workload of the failed primary node may be distributed among two or more partner nodes.

Figure 5:
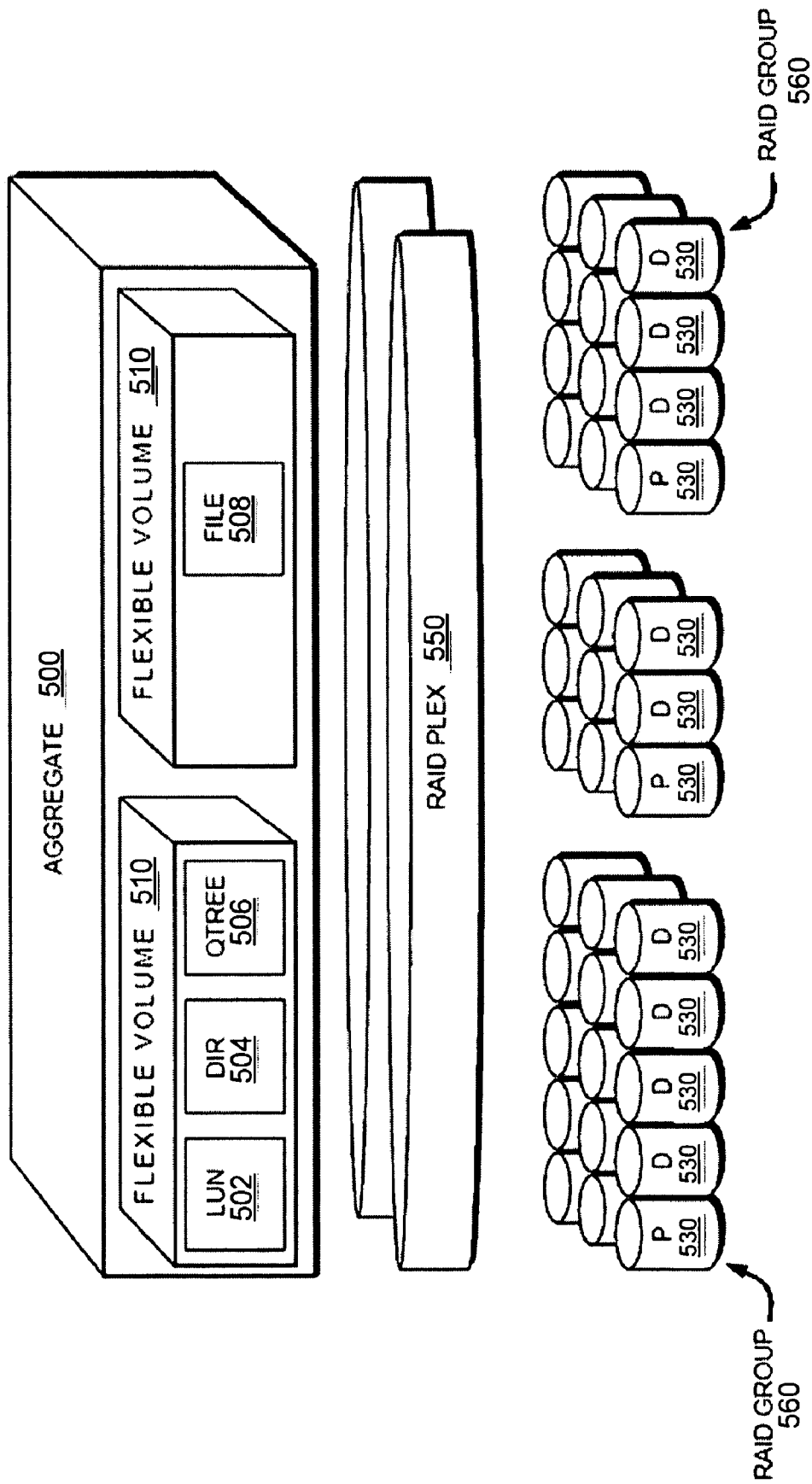
FIG. 5 is a schematic block diagram of an embodiment of an aggregate.

FIG. 5 is a schematic block diagram of an embodiment of an aggregate 500 (which may also be a data container, such as a physical volume) that may be used in some embodiments. The aggregate 500 may comprise one or more storage devices (e.g., disks 530), whereby the total storage space of an aggregate 500 may be provided by the one or more storage devices. The total storage space of an aggregate 500 may be allocated among a set of one or more flexible volumes 510. A flexible volume 510 may be dynamically increased or decreased in storage size within the total storage space of the aggregate 500. Each flexible volume 510 may comprise one or more data containers, such as, Luns (blocks) 502, directories 504, qtrees 506, files 508, etc. The aggregate 500 is illustratively layered on top of the RAID system, which is represented by at least one RAID plex 550 (depending upon whether the storage configuration is mirrored), wherein each plex 550 comprises at least one RAID group 560. Each RAID group further comprises a plurality of disks 530, e.g., one or more data (D) disks and at least one (P) parity disk. In general, each data container (e.g., flexible volume, aggregate, etc.) may have an associated identifier (ID) that uniquely identifies the data container within the shared storage 135. For example, each aggregate in the shared storage 135 may have an associated identifier (ID) that uniquely identifies the aggregate within the shared storage 135. Further detail regarding aggregates 500 and flexible volumes 510 is described in the above-referenced U.S. patent application Ser. No. 11/606,727.

Figure 6:
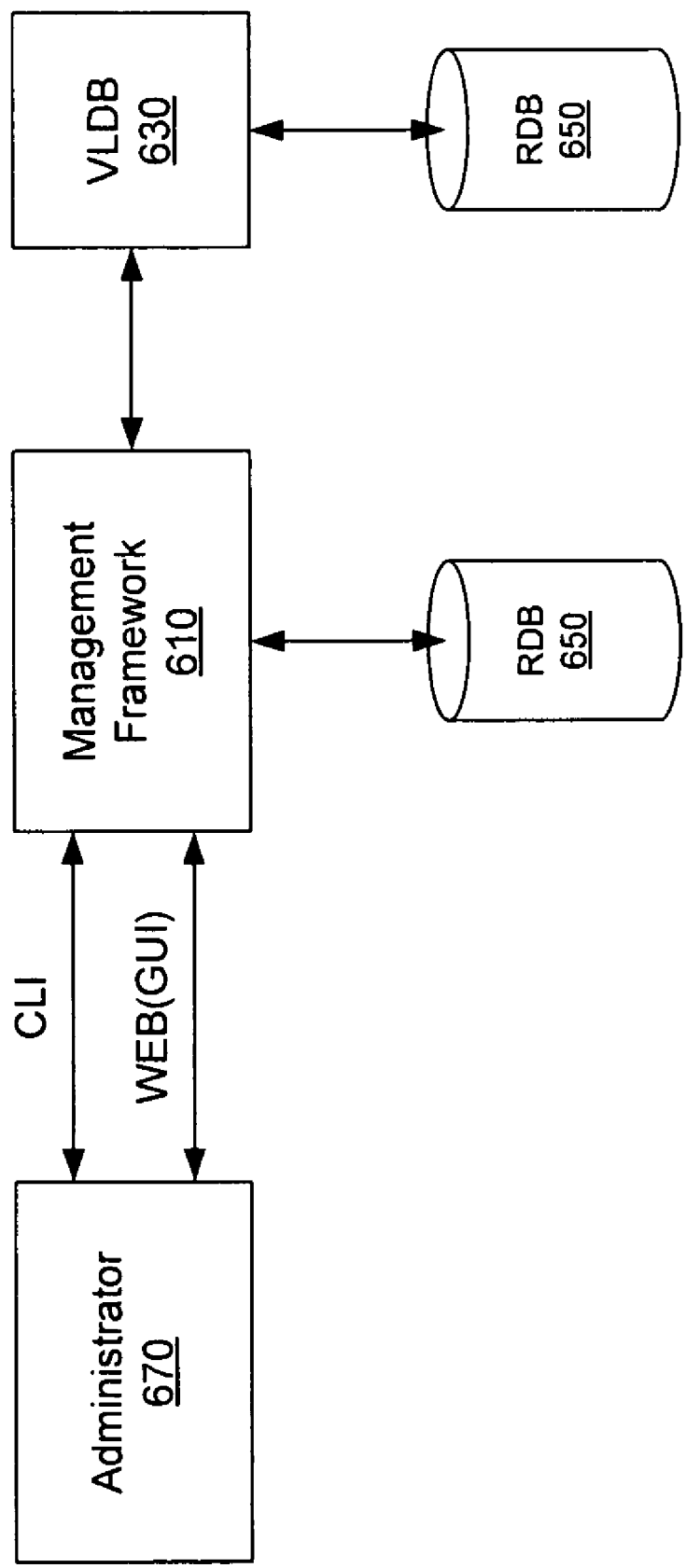
FIG. 6 is a schematic block diagram illustrating a collection of management processes.

FIG. 6 is a schematic block diagram illustrating a collection of management processes that execute as user mode applications on the storage operating system 300 to provide management of configuration information (i.e. management data) for the nodes of the cluster. To that end, the management processes include a management framework process 610 and a volume location database (VLDB) process 630, each utilizing a data replication service (RDB 650) linked as a library. The management framework 610 provides a user to an administrator 670 interface via a command line interface (CLI) and/or a web-based graphical user interface (GUI). The management framework is illustratively based on a conventional common interface model (CIM) object manager that provides the entity to which users/system administrators interact with a node 200 in order to manage the cluster 100.

The VLDB 630 is a database process that records/tracks the locations of the data containers (e.g., SVSs, flexible volumes, aggregates, etc.) within the shared storage 135 of the cluster 100 for routing requests throughout the cluster 100. As discussed above, each data container (e.g., flexible volume, aggregate, etc.) may have an associated identifier (ID) that uniquely identifies the data container within the shared storage 135. Also, each node 200 may have an associated identifier (ID) that uniquely identifies the node 200 within the cluster 100. Further, each D-module 350 may have an associated identifier (ID) that uniquely identifies the D-module 350 within the cluster 100. In some embodiments, the D-module ID of a D-module 350 may be the same as the node ID of the node in which the D-module 350 resides. The VLDB 630 may comprise a database containing information for mapping a data container identifier (e.g., contained in a request received from a client 180), to a particular node 200 (or D-module 350) that "owns" (services) the requested data container within the cluster 100. For example, the VLDB 630 may contain a plurality of entries, each entry comprising a data container ID (e.g., aggregate ID) and a corresponding node ID (or D-module ID) that owns the data container.

The entries of the VLDB 630 may be used to provide the contents of entries in the configuration table 235 (as shown in FIG. 2). Alternatively, the entries of the VLDB 630 may be loaded to memory 224 (as shown in FIG. 2). In general, when receiving an access request, the N-module 310 of a node 200 may access the VLDB 630/configuration table 235 for mapping a data container ID (received in the request) to a D-module 350 of a node 200 that owns the data container within the cluster 100. The N-module 310 may then route the request to the D-module 350 of the identified node 200 (e.g., through the cluster switching fabric 150). For example, when receiving a request, the N-module 310 of a node 200 may access the VLDB 630/configuration table 235 for mapping the SVS ID of a data container handle to a D-module 350 of a node that owns the data container. In some embodiments, VLDB entries keep track of the locations of the flexible volumes (hereinafter generally "volumes 510") and aggregates 500 within the cluster. Examples of such VLDB entries include a VLDB volume entry 700 (FIG. 7) and a VLDB aggregate entry 800 (FIG. 8).

Figure 7:
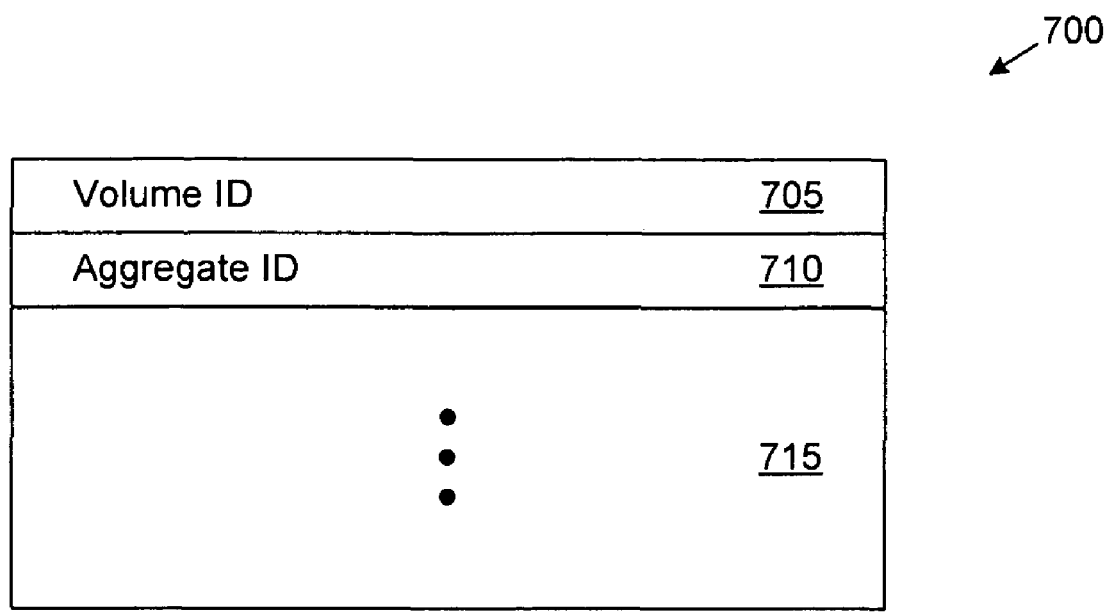
FIG. 7 is a schematic block diagram of an exemplary VLDB volume entry.

FIG. 7 is a schematic block diagram of an exemplary VLDB volume entry 700. The entry 700 includes a volume ID field 705, an aggregate ID field 710 and, in alternative embodiments, additional fields 715. The volume ID field 705 contains an ID that identifies a volume used in a volume location process. The aggregate ID field 710 identifies the aggregate 500 containing the volume identified by the volume ID field 705.

Figure 8:
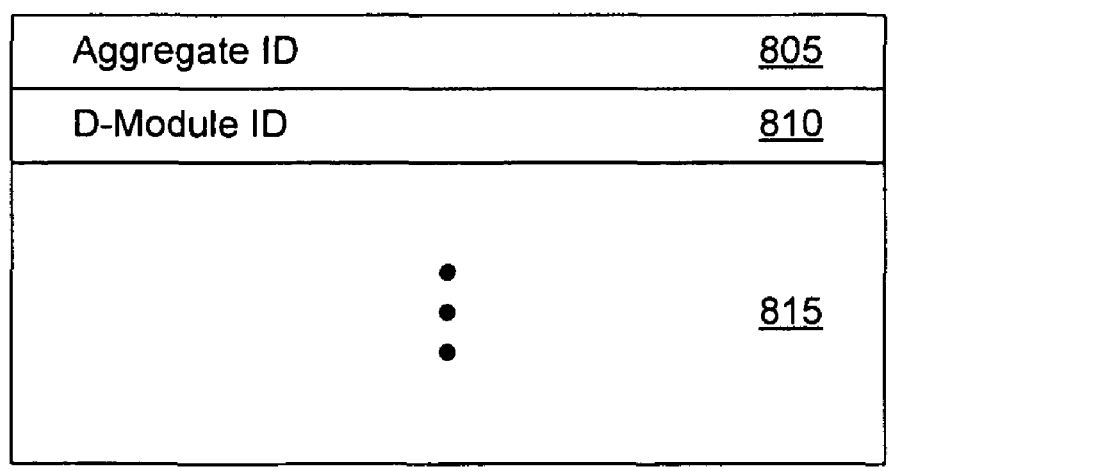
FIG. 8 is a schematic block diagram of an exemplary VLDB aggregate entry.

Likewise, FIG. 8 is a schematic block diagram of an exemplary VLDB aggregate entry 800. The VLDB 630 may contain an aggregate entry 800 for each aggregate in the shared storage 135. The entry 800 includes an aggregate ID field 805, a node ID/D-module ID field 810 and, in alternative embodiments, additional fields 815. The aggregate ID field 805 contains an ID of a particular aggregate 500 in the cluster 100. The node ID/D-module ID field 810 contains an ID of the node or D-module that owns and services the particular aggregate identified by the aggregate ID field 805.

Figure 9:
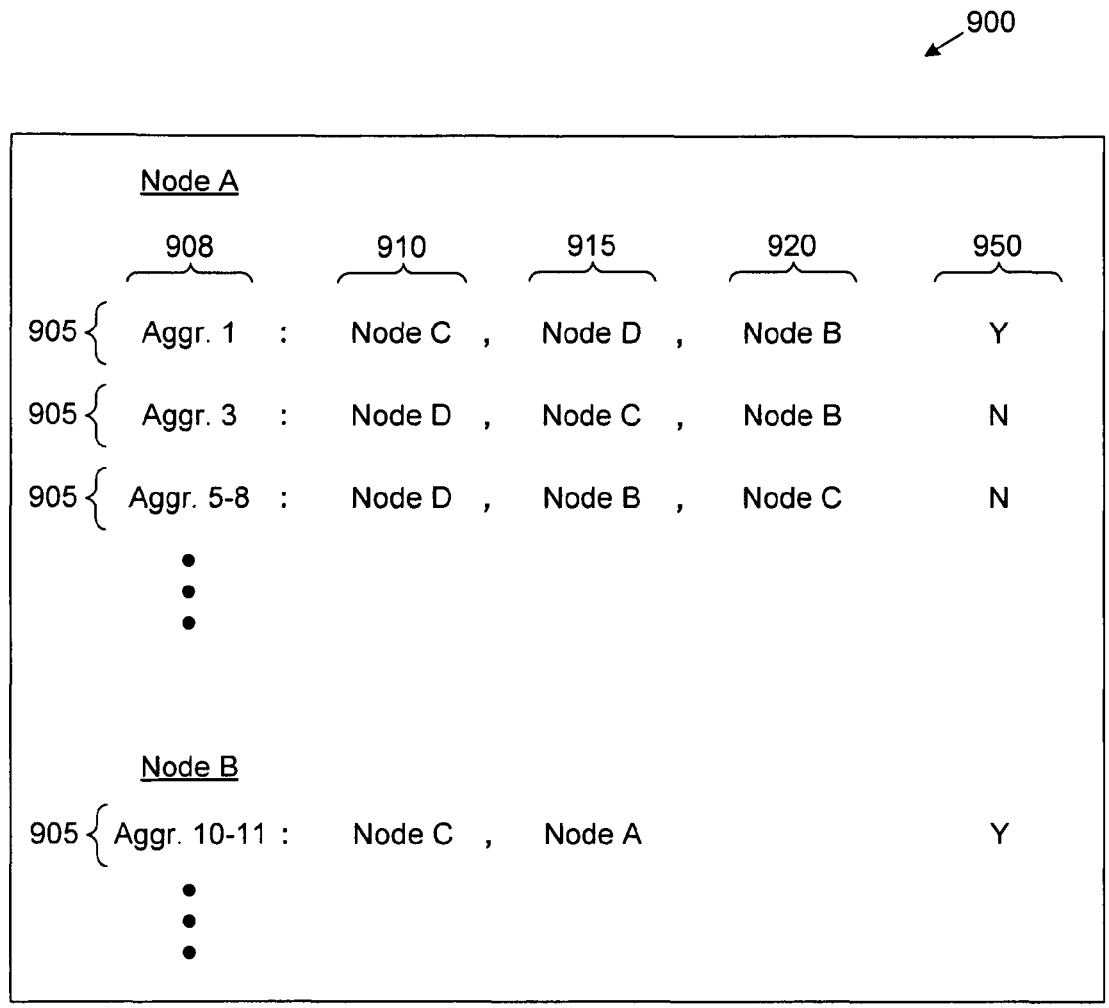
FIG. 9 shows a conceptual diagram of the contents of an exemplary AFDS.

As discussed above, the VLDB 630 may also include an aggregate failover data structure (AFDS) 900. FIG. 9 shows a conceptual diagram of the contents of an exemplary AFDS 900. Note that an AFDS 900 may comprise a data structure in any variety of forms (e.g., table, list, database, etc.) and FIG. 9 is for illustrative purposes only. In some embodiments, each node may maintain its own copy of the AFDS 900. For each primary node in the cluster 100, the AFDS 900 may specify two or more aggregate sub-sets, each aggregate sub-set comprising one or more aggregates within the shared storage that are owned by the primary node. For each aggregate sub-set, the AFDS may specify at least one partner node assigned and configured to takeover the aggregate sub-set if the primary node fails.

As shown in FIG. 9, for each primary node 200, the AFDS 900 may include a plurality of entries 905 representing a plurality of aggregate sub-sets owned by the primary node. Each entry 905 may comprise an aggregate sub-set field 908 and at least one failover partner node field 910. The aggregate sub-set field 908 specifies one or more identifiers (aggregate IDs) of one or more aggregates of the aggregate sub-set. The partner node field 910 specifies an identifier (node IDs or D-module IDs) of a partner node or D-module assigned and configured to takeover the one or more aggregates specified in the aggregate sub-set field 908 (e.g., if the primary node fails or a command is received to do so). For example, for primary node A, the AFDS may list an entry 905 for a first aggregate sub-set comprising aggregate 1 to be taken over by partner node C, a second aggregate sub-set comprising aggregate 3 to be taken over by partner node D, and a third aggregate sub-set comprising aggregates 5-8 to be taken over by partner node D. In further embodiments, as shown in FIG. 9, each entry 905 may also comprise an "ownership-giveback indicator" 950 that indicates whether or not ownership of the aggregate sub-set represented by the entry 905 is to be returned to the primary node after the primary node is brought back online (e.g., where "Y indicates ownership is to be returned).

In further embodiments, for each aggregate sub-set owned by the primary node, the AFDS 900 may specify an ordered data structure of two or more partner nodes assigned and configured to takeover the aggregate. The ordered data structure for an aggregate may specify the order of partner nodes that is to takeover the aggregate sub-set in the case of multiple node failures. For example, an ordered data structure may specify a "first-ordered" partner node (the highest-ordered partner node) that is to takeover the aggregate sub-set if the primary node fails, whereby takeover of the aggregate sub-set does not require any partner node failures. The ordered data structure may specify further partner nodes (lower-ordered partner nodes) that are assigned to takeover the aggregate sub-set upon failure of the primary node and failure of each higher-ordered partner node on the ordered data structure. For example, the ordered data structure may further specify a "second-ordered" partner node that is to takeover the aggregate sub-set if the primary node and the first-ordered partner node fails, a "third-ordered" partner node that is to takeover the aggregate sub-set if the primary node, the first-ordered partner node, and the second-ordered partner node fails, etc.

For example, as shown in FIG. 9, each entry 905 representing an aggregate sub-set may comprise an aggregate sub-set field 908 and two or more failover partner node fields 910, 915, 920. In the example of FIG. 9, the first partner node field 910 may comprise the first/highest-ordered partner node field and the third partner node field 920 may comprise the third/lowest-ordered partner node field in an entry 905. For example, for primary node A, the entry 905 for the first aggregate sub-set (comprising aggregate 1) comprises a first partner node field 910 specifying first-ordered partner node C assigned to takeover the first aggregate sub-set if the primary node A fails, a second partner node field 915 specifying second-ordered partner node D assigned to takeover the first aggregate sub-set if the primary node A and first-ordered partner node C fails, and a third partner node field 920 specifying third-ordered partner node B assigned to takeover the first aggregate sub-set if the primary node A, first-ordered partner node C, and second-ordered partner node D fails. As such, the AFDS 900 provides protection against multiple node failures for each aggregate sub-set owned by the primary node.

IV. Takeover of a Node on a Per Aggregate Basis

Figure 10:
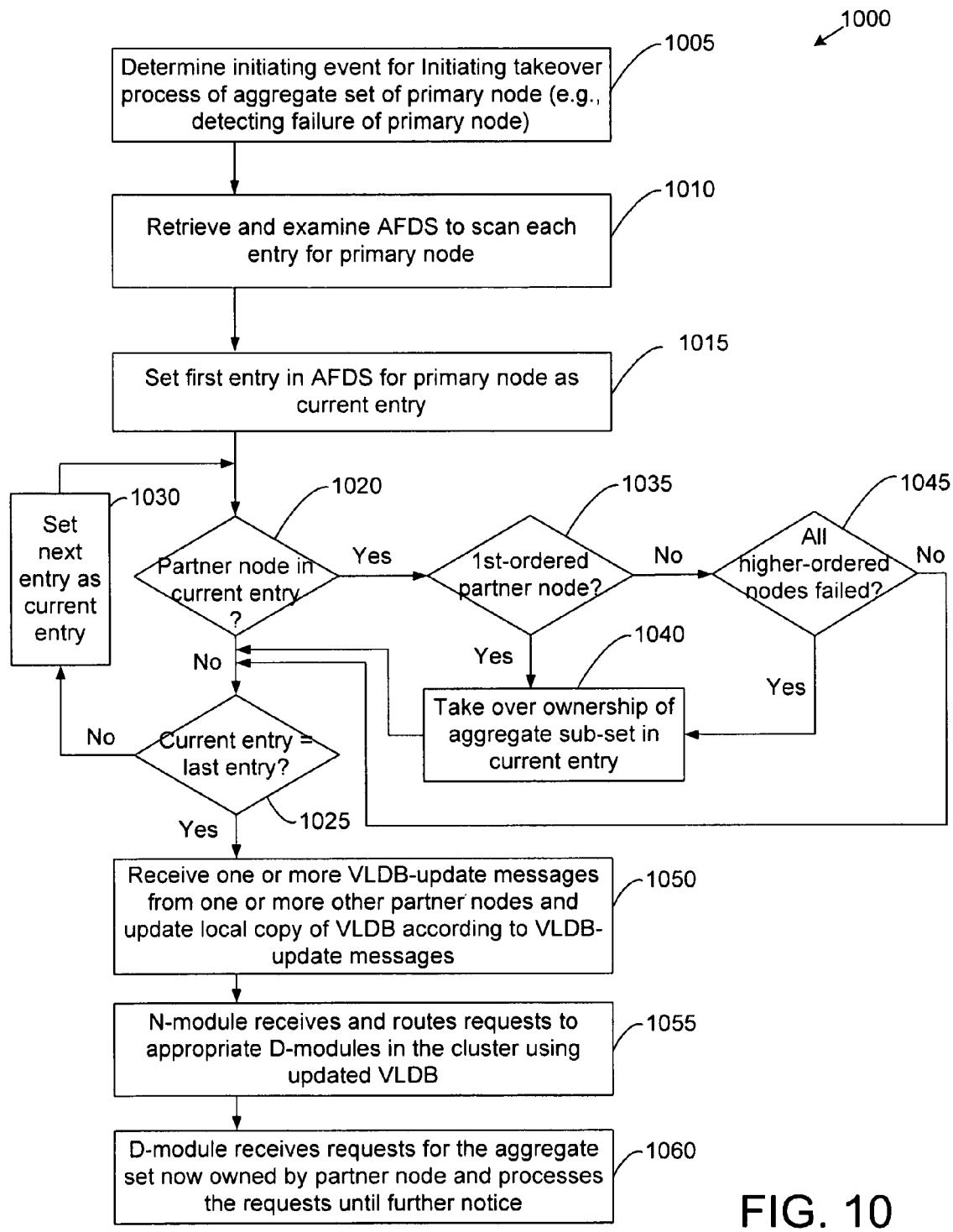
FIG. 10 is a flowchart of a method for taking over aggregates of a primary node, on a per aggregate basis, by two or more partner nodes of the primary node.

FIG. 10 is a flowchart of a method 1000 for taking over aggregates of a primary node, on a per aggregate basis, by two or more partner nodes of the primary node using the information in AFDS 900. In some embodiments, some of the steps of the method 1000 are implemented by software or hardware. In some embodiments, some of the steps of method 1000 are performed by software layers of each partner node 200 in the cluster 100. In some embodiments, some of the steps of method 1000 are performed by each takeover monitor module 376 residing and executing on each partner node 200 in the cluster 100. As such, the takeover monitor modules 376 residing on two or more partner nodes 200 may operate simultaneously to takeover the aggregate set of the primary node. The order and number of steps of the method 1000 are for illustrative purposes only and, in other embodiments, a different order and/or number of steps are used.

The method 1000 begins when the takeover monitor module 376 residing on a partner node determines (at 1005) an initiating event for initiating/triggering a takeover process of the aggregate set owned by the primary node. For example, the takeover monitor module 376 may determine an initiating event any variety of reasons, such as upon detecting failure of the primary node (e.g., due to absence of a heartbeat signal), upon receiving a node takeover command, etc. The primary node 200 may own an aggregate set comprising two or more aggregate sub-sets. The method 1000 then retrieves and examines/reads (at step 1010) the AFDS 900, and scans each entry 905 for the primary node in the AFDS 900.

The method 1000 sets (at step 1015) the first entry 905 for the primary node as the "current entry" 905. The current entry 905 may represent and specify an aggregate sub-set (in the aggregate sub-set field 908) owned by the primary node and specify an ordered data structure of one or more failover partner nodes (in the one or more failover partner node fields) to take over the aggregate sub-set specified in the current entry 905 (referred to below as the "specified aggregate sub-set").

The method then determines (at 1020) whether the partner node 200 or D-module 350 (in which the takeover monitor module 376 resides) is specified in the current entry 905. For example, the method may determine whether the identifier for the partner node 200 (or D-module 350) is contained in any partner node field 910, 915, 920 in the current entry 905. If not, the partner node is not assigned to take over the specified aggregate sub-set under any conditions and the method 1000 then continues at step 1025.

If the method determines (at 1020—Yes) that the partner node is specified in the current entry, the method 1000 then determines (at step 1035) whether the partner node (or D-module) is specified as a first-ordered partner node (highest-ordered partner node) in the current entry. For example, the method 1000 may determine whether the partner node field containing the identifier for the partner node comprises the first-ordered partner node field 910 in the current entry 905. If so, this indicates that the partner node is assigned to takeover the specified aggregate sub-set upon the primary node failing (without requiring any partner node failures). As such, the method 1000 then takes over ownership (at step 1040) of the specified aggregate sub-set. Details of the takeover process of the specified aggregate sub-set (in step 1040) is discussed below in relation to FIG. 11.

If the method determines (at step 1035—No) that the partner node is not specified as a first-ordered partner node in the current entry, this indicates that the partner node is a lower-ordered partner node that is assigned to takeover the specified aggregate sub-set upon failure of the primary node and failure of each higher-ordered partner node specified in the current entry. As such, the method 1000 then determines (at step 1045) whether each higher-ordered partner node (identified in the higher-ordered partner node fields) specified in the current entry has failed. The method 1000 may determine (at step 1045) that a higher-ordered partner node has "failed" if, for example, there is an absence of a heartbeat signal from the higher-ordered partner node or a command to takeover the higher-ordered partner node has been received. If the method 1000 determines (at step 1045 - Yes) that each higher-ordered partner node specified in the current entry has also failed, the method then takes over ownership (at step 1040) of the specified aggregate sub-set. If not, this indicates that one of the higher-ordered partner nodes in the current entry that has not failed will take over the specified aggregate sub-set and the method continues at step 1025.

At step 1025, the method 1000 determines whether the current entry is the last entry 905 for the primary node in the AFDS 900. If not, the method 1000 sets (at step 1030) the next entry 905 for the primary node in the AFDS 900 as the current entry 905 and returns to step 1020. If the method 1000 determines (at step 1025—Yes) that the current entry is the last entry 905, the method continues at step 1050.

Note that other takeover monitor modules 376 on one or more other partner nodes (remote partner node) of the primary node may be simultaneously performing the above steps to take over another aggregate sub-set of the primary node. After taking over an aggregate sub-set of the primary node, the remote partner node may then send a "VLDB-update" message to each other partner node in the cluster 100. As discussed below, the VLDB-update message, received from a remote partner node taking over a particular aggregate sub-set, may contain information for updating the separate local copy of the VLDB 630 to reflect the new ownership of the particular aggregate sub-set by the remote partner node. At step 1050, the method 1000 receives one or more VLDB-update messages from one or more other partner nodes in the cluster 100 and updates its separate copy of its VLDB 630 according to the one or more VLDB-update messages.

After the VLDB 630 for each partner node in the cluster is updated to reflect the new owners of the aggregate sub-sets of the primary node, the N-modules of the partner nodes will be able to receive requests from clients and route the requests to the appropriate D-modules of the partner nodes. At step 1055, the N-module of the partner node receives and routes requests to the appropriate D-modules in the cluster using the updated VLDB 630. At step 1060, the D-module of the partner node receives requests for the aggregate set owned by the partner node (including requests for the newly obtained aggregate sub-set previously owned by the primary node) and processes the requests until further notice (e.g. the primary node is brought back online).

Figure 11:
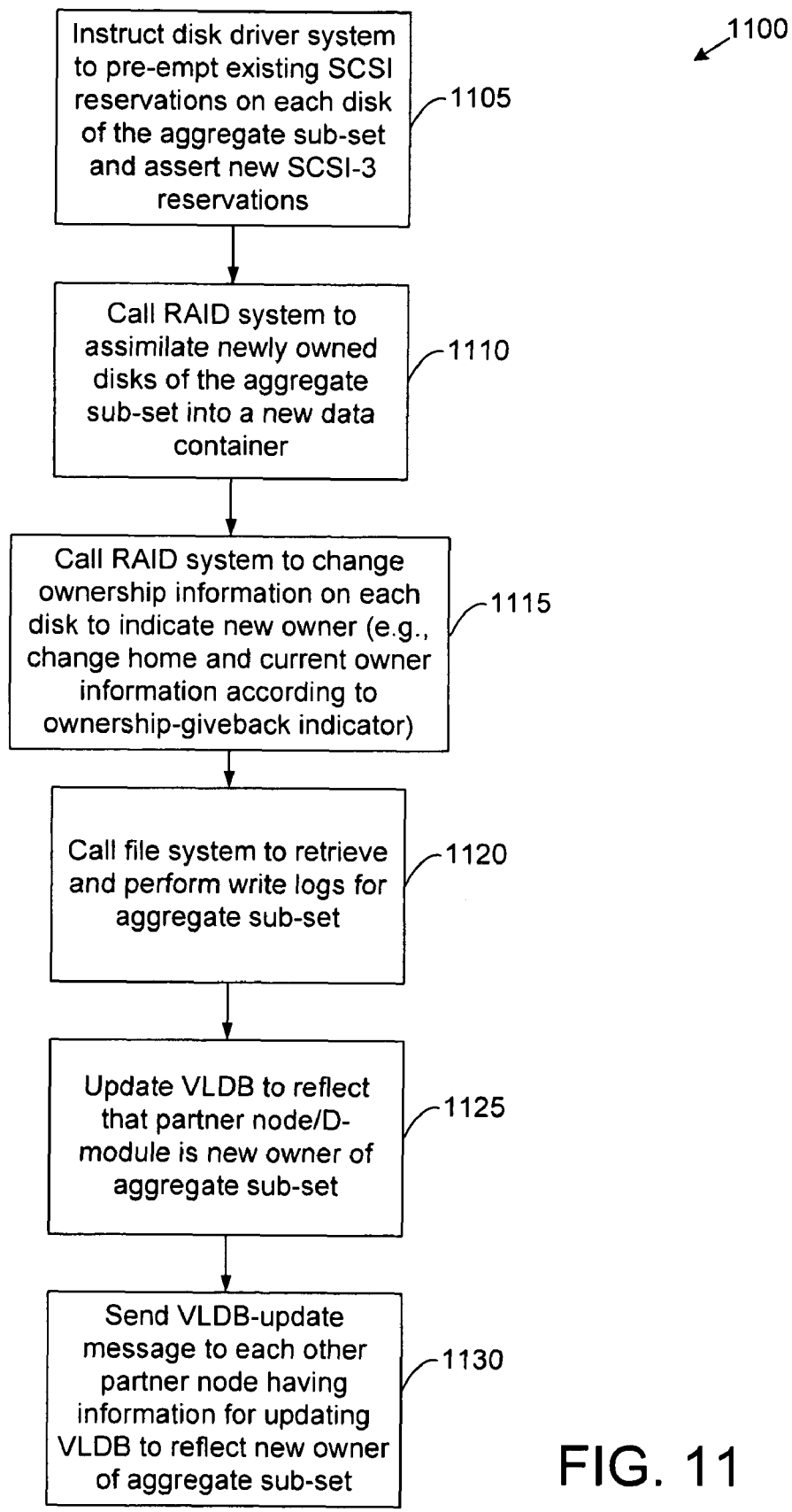
FIG. 11 is a flowchart of a method for taking over an aggregate sub-set by a partner node.

FIG. 11 is a flowchart of a method 1100 for taking over an aggregate sub-set (owned by a primary node) by a partner node. The partner node may be assigned to take over the aggregate sub-set as specified in a current entry 905 of the AFDS 900. The method 1100 may comprise step 1040 of FIG. 10. In some embodiments, some of the steps of the method 1100 are implemented by software or hardware. In some embodiments, some of the steps of method 1100 are performed by a takeover monitor module 376 residing and executing on the partner node. To do so, the takeover monitor module 376 may operate in conjunction with other software layers and modules residing on the partner node 200, such as the file system 360, the RAID system 380, the ownership module 382 and the disk driver system 390, instructing each to perform particular routines/threads to implement the takeover procedure. The order and number of steps of the method 1100 are for illustrative purposes only and, in other embodiments, a different order and/or number of steps are used.

The aggregate sub-set to be taken over may comprise a set of one or more storage devices (e.g., disks 130). The method 1100 may takeover the one or more storage devices following the below procedures. The method may instruct (at step 1105) the disk driver system 390 to pre-empt existing SCSI reservations on each disk of the aggregate sub-set (that were previously placed on the disks by the D-module of the primary node) and assert new SCSI-3 reservations on each disk of the aggregate sub-set. Using SCSI-3 reservations, a D-module can write to a disk if it holds the SCSI-3 reservations for that disk so that non-owning D-modules are prevented from writing to these disks because they do not have the SCSI-3 reservation. However, the non-owning file service can still read ownership information 132 from a predetermined location 134 on the disk. In some embodiments, if the SCSI-3 reservations do not match the on-disk ownership location data, the on-disk ownership information is used.

The method 1100 then calls (at step 1110) the RAID system 380 to assimilate all newly owned disks of the aggregate sub-set into a new data container. Illustratively, the RAID system 380 performs block-based assimilation of the newly acquired disks into aggregates, and the proper RAID calculations and configurations are performed. The method 1100 then calls (at step 1115) the RAID system 380 to change ownership information 132 on each disk 130 to indicate that the partner node is the new owner of the disk 130. The RAID system 380 may change the ownership information 132 according to the ownership-giveback indicator 950 in the current entry 905.

As discussed above, the ownership information 132 stored on a disk 130 may include "home owner" and "current owner" information. The home owner of a disk 130 may indicate a node that is the permanent or indefinite owner of the disk 130 until the node fails. The "current owner" of a disk 130 may identify a node (partner node) that is assigned to temporarily service data of the disk when a node (primary node) that is the home owner has failed or otherwise been taken offline. The "current owner" of a disk 130 may indicate a node that is the temporary owner of the disk 130 until the failed primary node has been brought back online and is again in an active state.

In some embodiments, if the ownership-giveback indicator 950 indicates that ownership of the aggregate sub-set represented by the current entry 905 is not to be returned to the primary node, the RAID system 380 changes the ownership information 132 on each disk 130 to indicate that the partner node is the new home owner and the new current owner of the disk 130. In some embodiments, if the ownership-giveback indicator 950 indicates that ownership of the aggregate sub-set is to be returned to the primary node, the RAID system 380 changes the ownership information 132 on each disk 130 to indicate that the partner node is the new current owner of the disk 130 (but not the new home owner of the disk 130). Thereafter, the aggregate sub-set is owned by the D-module of the partner node 200.

The method 1100 then calls (at step 1120) the file system 360 to retrieve (from local non-volatile storage device 230) and perform all accumulated write logs (NVRAM logs) for the aggregate sub-set on the disks 130 of the aggregate sub-set. As discussed above, each node may receive remote write logs 290 from each partner node and store the remote write logs 290 to a local non-volatile storage device 230 (as shown in FIG. 2). As such, each node will have a copy of accumulated write logs (non-performed write logs) for the aggregate set owned by each partner node in the cluster 100. By performing all stored write logs accumulated for the aggregate sub-set, the data in the aggregate sub-set will be as current/up-to-date as possible.

The method 1100 then updates (at step 1125) the VLDB 630 to reflect that, for each aggregate in the aggregate sub-set, the partner node (specifically, the D-module of the partner node) is the new owner of the aggregate and is servicing data for the aggregate. As discussed above, the VLDB 630 is used to map identifiers of data containers (e.g., volumes and aggregates) within the cluster 100 to the appropriate node that owns the data container. The VLDB 630 may include a plurality of aggregate entries 800 (FIG. 8), each entry 800 having an aggregate ID field 805 and a node ID/D-module ID field 810. For each entry 800 for each aggregate in the aggregate sub-set, the method may update the node ID/D-module ID field to contain the node ID/D-module ID of the partner node that now owns the aggregate identified in the aggregate ID field 805.

method 1100 then sends (at step 1130) a "VLDB-update" message to each other partner node 200 in the cluster 100. The VLDB-update message may contain information for the partner node 200 receiving the VLDB-update message to update its own copy of the VLDB 630 to reflect the new owner for each aggregate in the aggregate sub-set. For example, the VLDB-update message may contain aggregate IDs for each aggregate in the aggregate sub-set and the node ID/D-module ID for the new owner of each aggregate. The method 1100 then ends.

Some embodiments may be conveniently implemented using a conventional general purpose or a specialized digital computer or microprocessor programmed according to the teachings herein, as will be apparent to those skilled in the computer art. Appropriate software coding may be prepared by programmers based on the teachings herein, as will be apparent to those skilled in the software art. Some embodiments may also be implemented by the preparation of application-specific integrated circuits or by interconnecting an appropriate network of conventional component circuits, as will be readily apparent to those skilled in the art.

Some embodiments include a computer program product comprising a computer readable medium (media) having instructions stored thereon/in when executed (e.g., by a processor) perform methods, techniques, or embodiments described herein, the computer readable medium comprising sets of instructions for performing various steps of the methods, techniques, or embodiments described herein. The computer readable medium may comprise a storage medium having instructions stored thereon/in which may be used to control, or cause, a computer to perform any of the processes of an embodiment. The storage medium may include, without limitation, any type of disk including floppy disks, mini disks (MD's), optical disks, DVDs, CD-ROMs, micro-drives, and magneto-optical disks, ROMs, RAMs, EPROMs, EEPROMs, DRAMs, VRAMs, flash memory devices (including flash cards), magnetic or optical cards, nanosystems (including molecular memory ICs), RAID devices, remote data storage/archive/warehousing, or any other type of media or device suitable for storing instructions and/or data thereon/in.

Stored on any one of the computer readable medium (media), some embodiments include software instructions for controlling both the hardware of the general purpose or specialized computer or microprocessor, and for enabling the computer or microprocessor to interact with a human user and/or other mechanism utilizing the results of an embodiment. Such software may include without limitation device drivers, operating systems, and user applications. Ultimately, such computer readable media further includes software instructions for performing embodiments described herein. Included in the programming (software) of the general/specialized computer or microprocessor are software modules for implementing some embodiments.

Those of skill would further appreciate that the various illustrative logical blocks, modules, circuits, techniques, or method steps of embodiments described herein may be implemented as electronic hardware, computer software, or combinations of both. To illustrate this interchangeability of hardware and software, various illustrative components, blocks, modules, circuits, and steps have been described herein generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the embodiments described herein.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The techniques or steps of a method described in connection with the embodiments disclosed herein may be embodied directly in hardware, in software executed by a processor, or in a combination of the two. In some embodiments, a software module or software layer may comprise an engine comprising firmware or software and hardware configured to perform embodiments described herein. In general, functions of a software module or software layer described herein may be embodied directly in hardware, or embodied as software executed by a processor, or embodied as a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read data from, and write data to, the storage medium. In the alternative, the storage medium may be integral to the processor. The processor and the storage medium may reside in an ASIC. The ASIC may reside in a user device. In the alternative, the processor and the storage medium may reside as discrete components in a user device.

While the embodiments described herein have been described with reference to numerous specific details, one of ordinary skill in the art will recognize that the embodiments can be embodied in other specific forms without departing from the spirit of the embodiments. Thus, one of ordinary skill in the art would understand that the embodiments described herein are not to be limited by the foregoing illustrative details, but rather are to be defined by the appended claims.

We claim:

1. A method for taking over ownership of an aggregate set of a primary node by a plurality of partner nodes in a cluster storage system having a shared storage, the plurality of partner nodes comprising partner node A and partner node B, the aggregate set comprising first and second aggregate sub-sets, each aggregate sub-set comprising one or more aggregates in the shared storage owned by the primary node, the method comprising:
receiving, at the primary node, write requests for the aggregate set and producing write logs representing the write requests;
distributing the write logs to partner nodes A and B for local storage at partner nodes A and B;
determining an initiating event for takeover of ownership of the aggregate set of the primary node;
retrieving and scanning an aggregate failover data structure (AFDS), the AFDS specifying, for the first aggregate sub-set of the primary node, a first-ordered partner node, comprising partner node A, assigned to take over the first aggregate sub-set upon failure of the primary node and a second-ordered partner node assigned to take over the first aggregate sub-set upon failure of the primary node and the first-ordered partner node, and specifying, for the second aggregate sub-set of the primary node, a first-ordered partner node, comprising partner node B, assigned to take over the second aggregate sub-set upon failure of the primary node and a second-ordered partner node assigned to take over the second aggregate sub-set upon failure of the primary node and the first-ordered partner node;
taking over ownership of the aggregate set of the primary node by the plurality of partner nodes according to the AFDS comprising partner node A taking over ownership of the first aggregate sub-set and partner node B taking over ownership of the second aggregate sub-set;
performing, at partner node A, write logs for the first aggregate sub-set; and
performing, at partner node B, write logs for the second aggregate sub-set.

2. The method of claim 1, wherein the AFDS further specifies partner node B as a second-ordered partner node for the first aggregate sub-set of the primary node, the method further comprising:
upon detecting failure of partner node A, partner node B takes over ownership of the first aggregate sub-set.

3. The method of claim 1, wherein the plurality of partner nodes further comprises partner node C and partner node D, and the AFDS further specifies partner node C as a second-ordered partner node for the first aggregate sub-set and partner node D as a second-ordered partner node for the second aggregate sub-set of the primary node, the method further comprising:
upon detecting failure of partner node A, partner node C takes over ownership of the first aggregate sub-set; and
upon detecting failure of partner node B, partner node D takes over ownership of the second aggregate sub-set.

4. The method of claim 1, wherein:
an aggregate comprises one or more storage devices storing client data; and
a node that owns an aggregate is able to access client data of the aggregate, whereas other nodes in the cluster storage system are not allowed to access the client data of the aggregate.

5. The method of claim 4, wherein:
a location data structure is used to route access requests for client data to the node in the cluster storage system that owns the aggregate containing the requested client data, the location data structure specifying, for each aggregate in the shared storage, a node identifier of a node in the cluster that owns the aggregate; and
taking over ownership of the first and second aggregate sub-sets of the primary node comprises updating the location data structure to reflect that the plurality of partner nodes are new owners of the first and second aggregate sub-sets.

6. The method of claim 5, wherein each node stores and maintains a separate copy of the location data structure, the method further comprising:
upon a particular remote partner node taking over ownership of a particular aggregate sub-set of the primary node, sending an update message to each of the other partner nodes in the cluster storage system to update the separate copy of the location data structure to reflect that the particular remote partner node is the new owner of the particular aggregate sub-set.

7. The method of claim 1, wherein the AFDS further specifies, for each aggregate sub-set of the primary node, an ownership-giveback indicator that indicates whether ownership of the aggregate sub-set is to be returned to the primary node after the primary node is brought back online.

8. The method of claim 1, wherein an initiating event comprises detecting failure of the primary node or receiving a command for taking over ownership of the aggregate set of the primary node.

9. A non-transitory computer readable medium having instructions stored thereon when executed by a processor, take over ownership of an aggregate set of a primary node by a plurality of partner nodes in a cluster storage system having a shared storage, the plurality of partner nodes comprising partner node A and partner node B, the aggregate set comprising first and second aggregate sub-sets, each aggregate sub-set comprising one or more aggregates in the shared storage owned by the primary node, the computer readable medium comprising sets of instructions for:
receiving, at the primary node, write requests for the aggregate set and producing write logs representing the write requests;
distributing the write logs to partner nodes A and B for local storage at partner nodes A and B;

determining an initiating event for takeover of ownership of the aggregate set of the primary node;

retrieving and scanning an aggregate failover data structure (AFDS), the AFDS specifying, for the first aggregate sub-set of the primary node, a first-ordered partner node, comprising partner node A, assigned to take over the first aggregate sub-set upon failure of the primary node and a second-ordered partner node assigned to take over the first aggregate sub-set upon failure of the primary node and the first-ordered partner node, and specifying, for the second aggregate sub-set of the primary node, a first-ordered partner node, comprising partner node B, assigned to take over the second aggregate sub-set upon failure of the primary node and a second-ordered partner node assigned to take over the second aggregate sub-set upon failure of the primary node and the first-ordered partner node;

taking over ownership of the aggregate set of the primary node by the plurality of partner nodes according to the AFDS comprising partner node A taking over ownership of the first aggregate sub-set and partner node B taking over ownership of the second aggregate sub-set;

performing, at partner node A, write logs for the first aggregate sub-set; and performing, at partner node B, write logs for the second aggregate sub-set.

10. The non-transitory computer readable medium of claim 9, wherein the AFDS further specifies partner node B as a second-ordered partner node for the first aggregate sub-set of the primary node, the computer readable medium further comprising a set of instructions for:

upon detecting failure of partner node A, partner node B takes over ownership of the first aggregate sub-set.

11. The non-transitory computer readable medium of claim 9, wherein the plurality of partner nodes further comprises partner node C and partner node D, and the AFDS further specifies partner node C as a second-ordered partner node for the first aggregate sub-set and partner node D as a second-ordered partner node for the second aggregate sub-set of the primary node, the computer readable medium further comprising a set of instructions for:

upon detecting failure of partner node A, partner node C takes over ownership of the first aggregate sub-set; and upon detecting failure of partner node B, partner node D takes over ownership of the second aggregate sub-set.

12. The non-transitory computer readable medium of claim 9, wherein:

an aggregate comprises one or more storage devices storing client data; and a node that owns an aggregate is able to access client data of the aggregate, whereas other nodes in the cluster storage system are not allowed to access the client data of the aggregate.

13. The non-transitory computer readable medium of claim 12, wherein:

a location data structure is used to route access requests for client data to the node in the cluster storage system that owns the aggregate containing the requested client data, the location data structure specifying, for each aggregate in the shared storage, a node identifier of a node in the cluster that owns the aggregate; and the set of instructions for taking over ownership of the first and second aggregate sub-sets of the primary node comprises a set of instructions for updating the location data structure to reflect that the plurality of partner nodes are new owners of the first and second aggregate sub-sets.

14. The non-transitory computer readable medium of claim 13, wherein each node stores and maintains a separate copy of the location data structure, the computer readable medium further comprising a set of instructions for:

upon a particular remote partner node taking over ownership of a particular aggregate sub-set of the primary node, sending an update message to each of the other partner nodes in the cluster storage system to update the separate copy of the location data structure to reflect that the particular remote partner node is the new owner of the particular aggregate sub-set.

15. The non-transitory computer readable medium of claim 9, wherein the AFDS further specifies, for each aggregate sub-set of the primary node, an ownership-giveback indicator that indicates whether ownership of the aggregate sub-set is to be returned to the primary node after the primary node is brought back online.

16. The non-transitory computer readable medium of claim 9, wherein an initiating event comprises detecting failure of the primary node or receiving a command for taking over ownership of the aggregate set of the primary node.

17. A cluster storage system for taking over ownership of an aggregate set of a primary node by a plurality of partner nodes in the cluster storage system having a shared storage, the plurality of partner nodes comprising partner node A and partner node B, the cluster storage system comprising:

the primary node owning the aggregate set comprising first and second aggregate sub-sets, each aggregate sub-set comprising one or more aggregates in the shared storage, the primary node comprising an operating system configured for:

receiving write requests for the aggregate set and producing write logs representing the write requests; and distributing the write logs to partner nodes A and B for local storage at partner nodes A and B; and the plurality of partner nodes, each partner node comprising an operating system configured for:

determining an initiating event for takeover of ownership of the aggregate set of the primary node;

retrieving and scanning an aggregate failover data structure (AFDS), the AFDS specifying, for the first aggregate sub-set of the primary node, a first-ordered partner node, comprising partner node A, assigned to take over the first aggregate sub-set upon failure of the primary node and a second-ordered partner node assigned to take over the first aggregate sub-set upon failure of the primary node and the first-ordered partner node, and specifying, for the second aggregate sub-set of the primary node, a first-ordered partner node, comprising partner node B, assigned to take over the second aggregate sub-set upon failure of the primary node and a second-ordered partner node assigned to take over the second aggregate sub-set upon failure of the primary node and the first-ordered partner node; and taking over ownership of the aggregate set of the primary node by the plurality of partner nodes according to the AFDS comprising partner node A taking over ownership of the first aggregate sub-set and performing write logs for the first aggregate sub-set and partner node B taking over ownership of the second aggregate sub-set and performing write logs for the second aggregate sub-set.

18. The cluster storage system of claim 17, wherein:

the AFDS further specifies partner node B as a second-ordered partner node for the first aggregate sub-set of the primary node; and the operating system of partner node B is further configured for:
upon detecting failure of partner node A, taking over ownership of the first aggregate sub-set.

19. The cluster storage system of claim 17, wherein:
the plurality of partner nodes further comprises partner node C and partner node D;
the AFDS further specifies partner node C as a second-ordered partner node for the first aggregate sub-set and partner node D as a second-ordered partner node for the second aggregate sub-set of the primary node;
the operating system of partner node C is configured for:
upon detecting failure of partner node A, taking over ownership of the first aggregate sub-set; and
the operating system of partner node D is configured for:
upon detecting failure of partner node B, taking over ownership of the second aggregate sub-set.

20. The cluster storage system of claim 17, wherein:
an aggregate comprises one or more storage devices storing client data; and
a node that owns an aggregate is able to access client data of the aggregate, whereas other nodes in the cluster storage system are not allowed to access the client data of the aggregate.

21. The cluster storage system of claim 17, wherein the AFDS further specifies, for each aggregate sub-set of the primary node, an ownership-giveback indicator that indicates whether ownership of the aggregate sub-set is to be returned to the primary node after the primary node is brought back online.

22. The cluster storage system of claim 17, wherein an initiating event comprises detecting failure of the primary node or receiving a command for taking over ownership of the aggregate set of the primary node.

23. A method for taking over ownership of an aggregate set of a primary node by a plurality of partner nodes in a cluster storage system having a shared storage, the plurality of partner nodes comprising partner node A and partner node B, the aggregate set comprising first and second aggregate sub-sets, each aggregate sub-set comprising one or more aggregates in the shared storage owned by the primary node, the method comprising:
receiving, at the primary node, write requests for the aggregate set and producing write logs representing the write requests;
distributing the write logs to partner nodes A and B for local storage at partner nodes A and B;
determining an initiating event for takeover of ownership of the aggregate set of the primary node;
retrieving and scanning an aggregate failover data structure (AFDS), the AFDS specifying, for the first aggregate sub-set of the primary node, a first partner node, comprising partner node A, assigned to take over the first aggregate sub-set upon failure of the primary node and a second partner node assigned to take over the first aggregate sub-set upon failure of the primary node and the first partner node, and specifying, for the second aggregate sub-set of the primary node, a third partner node, comprising partner node B, assigned to take over the second aggregate sub-set upon failure of the primary node and a fourth partner node assigned to take over the second aggregate sub-set upon failure of the primary node and the third partner node;
taking over ownership of the aggregate set of the primary node by the plurality of partner nodes according to the AFDS comprising partner node A taking over ownership of the first aggregate sub-set and partner node B taking over ownership of the second aggregate sub-set;
performing, at partner node A, write logs for the first aggregate sub-set; and
performing, at partner node B, write logs for the second aggregate sub-set.

24. The method of claim 23, further comprising:
upon detecting failure of the first partner node and the third partner node, the second partner node taking over ownership of the first aggregate sub-set and the fourth partner node taking over ownership of the second aggregate sub-set.

* * * * *